United States Patent
Hashimoto et al.

(10) Patent No.: US 12,240,443 B2
(45) Date of Patent: Mar. 4, 2025

(54) VEHICLE CONTROL APPARATUS, VEHICLE CONTROL METHOD, AND VEHICLE CONTROL SYSTEM

(71) Applicant: Hitachi Astemo, Ltd., Hitachinaka (JP)

(72) Inventors: Katsuhiko Hashimoto, Ibaraki (JP); Satoru Matsuda, Ibaraki (JP); Satoshi Kashiwamura, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 371 days.

(21) Appl. No.: 17/641,275

(22) PCT Filed: Jul. 9, 2020

(86) PCT No.: PCT/JP2020/026819
§ 371 (c)(1),
(2) Date: Mar. 8, 2022

(87) PCT Pub. No.: WO2021/059670
PCT Pub. Date: Apr. 1, 2021

(65) Prior Publication Data
US 2022/0289174 A1    Sep. 15, 2022

(30) Foreign Application Priority Data

Sep. 27, 2019  (JP) .................................. 2019-177003

(51) Int. Cl.
*B60W 30/09*    (2012.01)
*B60T 7/12*    (2006.01)
(Continued)

(52) U.S. Cl.
CPC ............... *B60W 30/09* (2013.01); *B60T 7/12* (2013.01); *B60W 30/0956* (2013.01);
(Continued)

(58) Field of Classification Search
CPC ............. B60W 30/09; B60W 30/0956; B60W 40/068; B60W 40/08; B60W 60/0015;
(Continued)

(56) References Cited

U.S. PATENT DOCUMENTS 10,266,180 B1 * 4/2019 Fields .................. G05D 1/0278
10,829,128 B2 * 11/2020 Hoshikawa ........... B60W 30/09
(Continued)

FOREIGN PATENT DOCUMENTS

| JP | 7-21500 A | 1/1995 |
|---|---|---|
| JP | 8-48226 A | 2/1996 |

(Continued)

OTHER PUBLICATIONS

Keller et al. "Driving Simulator Study on an Emergency Steering Assist," 2014 IEEE International Conference on Systems, Man, and Cybernetics, Oct. 5-8, 2014, San Diego, CA, 3008-3013. (Year: 2014).*

(Continued)

*Primary Examiner* — Daniel M. Robert
(74) *Attorney, Agent, or Firm* — Crowell & Moring LLP

(57) ABSTRACT

A vehicle control apparatus acquires a first collision risk based on a relative distance and a relative speed between an obstacle ahead of a vehicle and the vehicle, outputs a first control instruction for autonomously applying a braking force to the vehicle based on the first collision risk, acquires a second collision risk into which the first collision risk is updated after the braking force is autonomously applied to the vehicle, outputs a second control instruction for autonomously applying a force regarding steering to the vehicle based on the second collision risk, and outputs a third control instruction for controlling the braking force to be generated on a wheel portion of the vehicle based on the (Continued)

second collision risk after the force regarding the steering is autonomously applied to the vehicle.

5 Claims, 19 Drawing Sheets

(51) Int. Cl.
- *B60W 30/095* (2012.01)
- *B60W 40/068* (2012.01)
- *B60W 40/08* (2012.01)
- *B60W 60/00* (2020.01)

(52) U.S. Cl.
CPC .......... *B60W 40/068* (2013.01); *B60W 40/08* (2013.01); *B60W 60/0015* (2020.02); *B60W 60/005* (2020.02); *B60W 2554/80* (2020.02)

(58) Field of Classification Search
CPC ....... B60W 2554/80; B60W 2554/802; B60W 2554/804; B60W 10/18; B60W 10/20; B60W 30/08; B60W 40/04; B60W 40/109; B60W 50/08; B60T 7/12; B60T 2201/022; B60T 7/22; B60T 2210/12; B60T 8/17558; B60T 8/172; B60T 8/1755; G08G 1/165; G08G 1/166

See application file for complete search history.

(56) References Cited

U.S. PATENT DOCUMENTS

| | | | | |
|---|---|---|---|---|
| 2012/0101713 | A1* | 4/2012 | Moshchuk | B60W 40/064 701/301 |
| 2013/0030651 | A1* | 1/2013 | Moshchuk | B60W 30/09 701/41 |
| 2013/0054128 | A1* | 2/2013 | Moshchuk | B62D 15/0265 701/301 |
| 2013/0173132 | A1* | 7/2013 | Yuasa | B60W 30/0956 701/70 |
| 2013/0338878 | A1* | 12/2013 | Fritz | B60W 10/20 701/1 |
| 2014/0303827 | A1* | 10/2014 | Dolgov | B60W 30/00 701/23 |
| 2016/0152238 | A1* | 6/2016 | Mita | B60W 10/06 180/197 |
| 2017/0057498 | A1* | 3/2017 | Katoh | B60W 30/0956 |
| 2017/0291602 | A1* | 10/2017 | Newman | B60W 10/04 |
| 2018/0072312 | A1* | 3/2018 | Park | B60W 30/095 |
| 2018/0257644 | A1* | 9/2018 | Morotomi | G01S 13/931 |
| 2018/0373244 | A1* | 12/2018 | Augst | B60W 50/16 |
| 2019/0092320 | A1* | 3/2019 | Nagata | B60W 30/09 |
| 2022/0289174 | A1* | 9/2022 | Hashimoto | B60W 60/0015 |

FOREIGN PATENT DOCUMENTS

| | | |
|---|---|---|
| JP | 2007-261497 A | 10/2007 |
| JP | 2019-137139 A | 8/2019 |

OTHER PUBLICATIONS

International Search Report (PCT/ISA/210) issued in PCT Application No. PCT/JP2020/026819 dated Sep. 24, 2020 with English translation (seven (7) pages).

Japanese-language Written Opinion (PCT/ISA/237) issued in PCT Application No. PCT/JP2020/026819 dated Sep. 24, 2020 with English translation (eight (8) pages).

* cited by examiner ations. # VEHICLE CONTROL APPARATUS, VEHICLE CONTROL METHOD, AND VEHICLE CONTROL SYSTEM

TECHNICAL FIELD

The present invention relates to a vehicle control apparatus, a vehicle control method, and a vehicle control system.

BACKGROUND ART

PTL 1 discloses an autonomous brake control apparatus for an automobile that detects a distance and a relative speed between the subject vehicle (or an own vehicle) and an obstacle to determine a contact possibility therebetween, and autonomously applies a brake pressure to each wheel to brake the vehicle if determining that there is a contact possibility.

When detecting a driver's steering operation, the above-described autonomous brake control apparatus controls the brake pressure wheel by wheel so as to increase turnability of the vehicle in the direction of this operation.

Further, the above-described autonomous brake control apparatus controls the brake pressure wheel by wheel in this manner only when detecting the driver's steering operation and determining that the subject vehicle and the obstacle are in an approaching state, and further determining that contact between the subject vehicle and the obstacle cannot be avoided only by braking the vehicle based on the control of the brake pressure.

CITATION LIST

Patent Literature

PTL 1: Japanese Patent Application Public Disclosure No. 7-21500

SUMMARY OF INVENTION

Technical Problem

Then, emergent obstacle avoidability may reduce in the system that controls the brake pressure wheel by wheel on condition that the steering operation is performed by the driver under such a situation that contact between the vehicle and the obstacle cannot be avoided only by applying the braking force to the vehicle.

An object of the present invention is to provide a vehicle control apparatus, a vehicle control method, and a vehicle control system capable of preventing a reduction in emergent obstacle avoidability.

Solution to Problem

One aspect of the present invention acquires a first collision risk, which is information regarding a risk of a collision with an obstacle based on a relative distance and a relative speed between the obstacle ahead of a vehicle that is acquired by an external world perception portion, and the vehicle, outputs a first control instruction for autonomously applying a braking force to the vehicle based on the first collision risk, acquires a second collision risk into which the first collision risk is updated after the braking force is autonomously applied to the vehicle according to the first control instruction, outputs a second control instruction for autonomously applying a force regarding steering to the vehicle based on the second collision risk, and outputs a third control instruction for controlling the braking force to be generated on a wheel portion of the vehicle based on the second collision risk after the force regarding the steering is autonomously applied to the vehicle according to the second control instruction.

According to the one aspect of the present invention, it is possible to prevent the reduction in the obstacle emergent avoidability.

BRIEF DESCRIPTION OF DRAWINGS

FIG. 13 is a timing chart illustrating changes in the yaw rate, the lateral acceleration, the brake hydraulic pressures, and the like with the braking moment application mode turned on.

DESCRIPTION OF EMBODIMENTS

In the following description, embodiments of a vehicle control apparatus, a vehicle control method, and a vehicle control system according to an embodiment of the present invention will be described with reference to the drawings.

Figure 1:
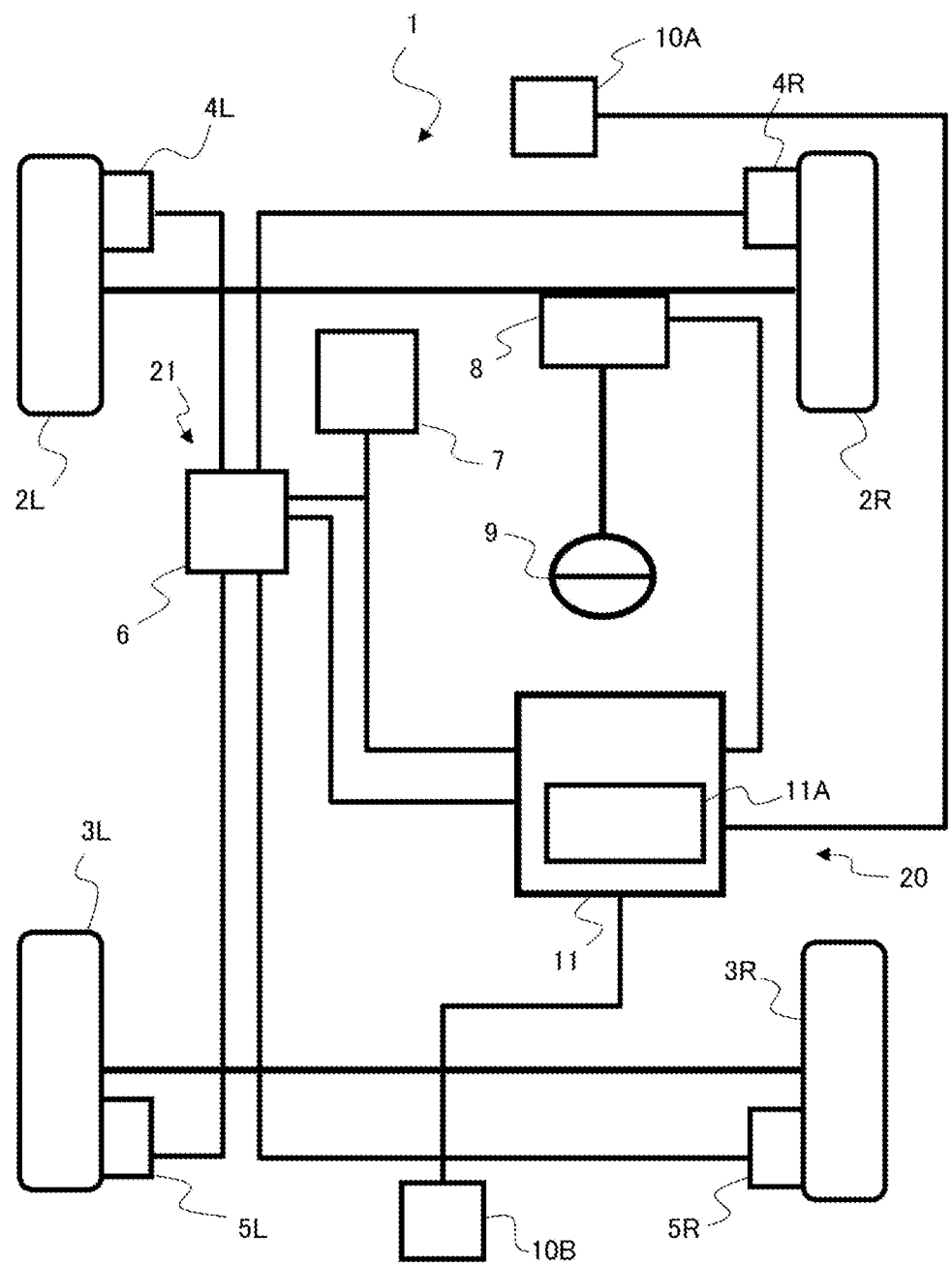
FIG. 1 illustrates the configuration of a vehicle control system.

FIG. 1 is a block diagram illustrating one embodiment of a vehicle control system 20.

A vehicle 1 illustrated in FIG. 1 is a four-wheeled automobile, and a vehicle including a steering apparatus that turns front wheels via a rotational operation of a steering wheel, such as an electric power steering apparatus, and an electronic control apparatus that controls the steering apparatus, and further including apparatuses such as an external world perception apparatus that acquires external world information such as road information ahead of the vehicle 1 by using, for example, both a camera, a radar, or a GPS (Global Positioning System) and map information, and an electronic stability controller that acquires, for example, information regarding the running speed of the vehicle 1 and the running state of the vehicle 1, thereby being able to perform a driving aid or autonomous driving.

The vehicle 1 includes a wheel portion including a front left wheel 2L, a front right wheel 2R, a rear left wheel 3L, and a rear right wheel 3R.

The individual wheels 2L, 2R, 3L, and 3R include wheel cylinders 4L, 4R, 5L, and 5R forming a hydraulic braking apparatus 21, respectively.

A wheel cylinder hydraulic pressure control apparatus 6 as a braking control apparatus is an electronic control apparatus represented by an electronic stability controller that acquires various kinds of vehicle information from a vehicle information acquisition apparatus 7 and controls a brake hydraulic pressure to apply to each of the wheel cylinders 4L, 4R, 5L, and 5R.

The vehicle 1 according to the present exemplary embodiment includes the hydraulic braking apparatus 21 as a braking apparatus, but may include an electric brake apparatus instead of the hydraulic braking apparatus 21 and the control of the braking force is not limited to hydraulic pressure control.

The vehicle information acquisition apparatus 7 includes a speed acquisition portion, a deceleration acquisition portion, a specification information acquisition portion, and the like. The speed acquisition portion acquires the running speed (the vehicle body speed) of the vehicle 1. The deceleration acquisition portion acquires the deceleration of the vehicle 1. The specification information acquisition portion acquires the specification information of the vehicle 1.

An electric power steering apparatus 8 is a steering control apparatus that assists an operation of a steering wheel 9 performed by a driver with use of a torque generated by a motor serving as a steering actuator, and can autonomously steer the front wheels 2L and 2R with use of the motor.

The electric power steering apparatus 8 includes a steering torque sensor, a driving circuit, a control circuit, and the like, in addition to the motor. The steering torque sensor detects a steering torque (a torque for steering). The driving unit drives the motor. The control circuit controls the torque to be generated by the motor.

A first external world perception apparatus 10A is a first external world perception portion that acquires external world information such as road information and obstacle information ahead of the vehicle 1 using a camera, a radar, or the like. Further, a second external world perception apparatus 10B is a second external world perception portion that acquires external world information such as another vehicle running behind the vehicle 1 using a camera, a radar, or the like.

The vehicle 1 can include an external world perception apparatus that acquires external world information in all directions, and is not limited to the system including the external world perception apparatuses on the front side and the rear side thereof.

A vehicle control apparatus 11 is an electronic control apparatus mainly formed by a microcomputer 11A including a processor, a memory, an I/O, and a bus connecting them. The microcomputer 11A functions as a control portion that carries out a calculation based on input various kinds of information and outputs a result of the calculation.

The vehicle control apparatus 11 includes a driving aid function of autonomously controlling braking and steering to avoid a collision of the vehicle 1 with an obstacle ahead thereof based on the various kinds of information acquired from the external world perception apparatuses 10A and 10B, the vehicle information acquisition apparatus 7, and the like as software.

Then, the vehicle control apparatus 11 outputs a steering torque instruction for avoiding the collision to the electric power steering apparatus 8 as a steering control instruction, and also outputs an instruction indicating a target brake hydraulic pressure for avoiding the collision to the wheel cylinder hydraulic pressure control apparatus 6 as a braking control instruction.

In the following description, the steering control and the braking control for avoiding the collision by the vehicle control apparatus 11 will be described in detail.

Figure 2:
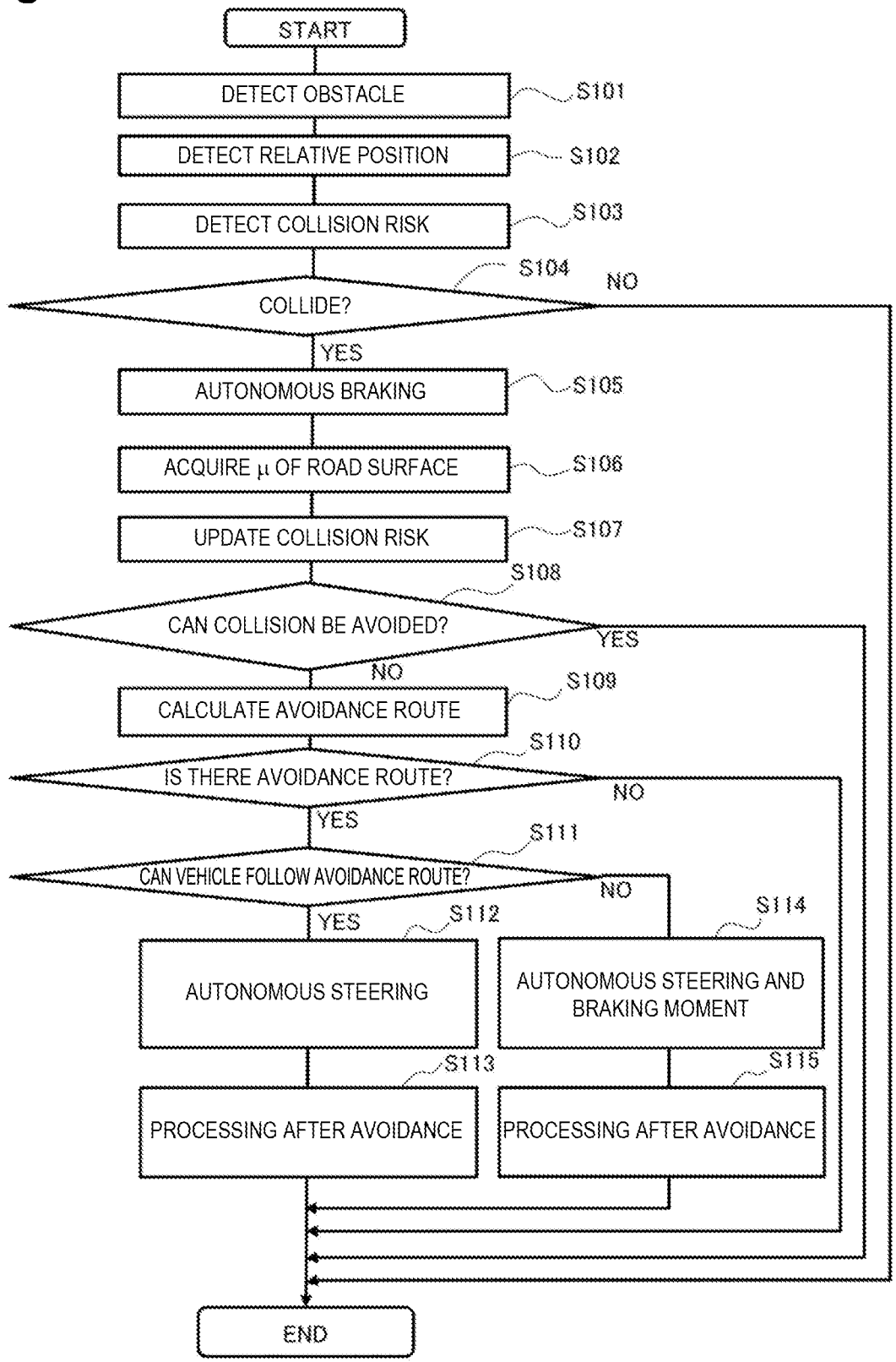
FIG. 2 is a flowchart illustrating a main routine of collision avoidance control.

FIG. 2 is a flowchart illustrating a main routine of collision avoidance control performed by the vehicle control apparatus 11.

First, in step S101, the vehicle control apparatus 11 attempts to detect an obstacle ahead of the vehicle 1 based on the external world information ahead of the vehicle 1 that is acquired from the first external world perception apparatus 10A.

Then, if an obstacle is detected ahead of the vehicle 1, in the next step, step S102, the vehicle control apparatus 11 identifies the relative positional relationship between the vehicle 1 and the obstacle.

The obstacle includes a stationary object, which is a stationary three-dimensional object, and a moving object, which is a moving three-dimensional object.

Figure 3:
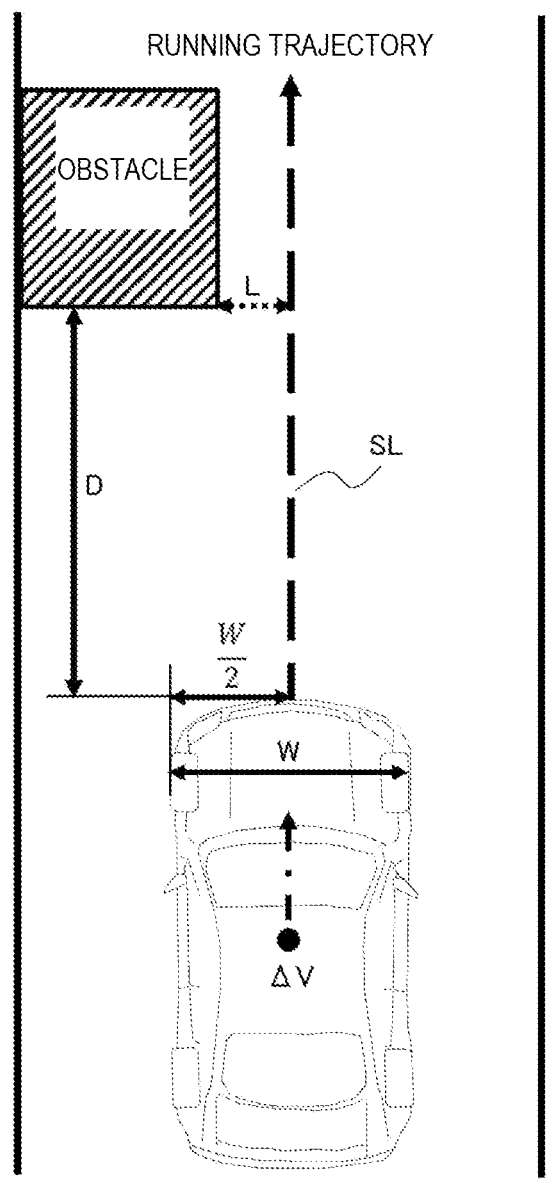
FIG. 3 illustrates the positional relationship between a vehicle and an obstacle.

FIG. 3 exemplarily illustrates the relative positional relationship between the vehicle 1 and the obstacle.

The vehicle control apparatus 11 determines a relative distance D [m] between the vehicle 1 and the obstacle, a distance L [m] from a center SL of a running trajectory of the vehicle 1 to the obstacle, and a relative speed ΔV [m/s] between the vehicle 1 and the obstacle illustrated in FIG. 3 as physical amounts indicating the relative positional relationship between the vehicle 1 and the obstacle in step S102.

In FIG. 3, W represents the full width [m] of the vehicle 1.

Next, in step S103, the vehicle control apparatus 11 calculates a time-to-collision TTC [s], which is a time predicted to be taken until the vehicle 1 collides with the obstacle, based on the relative distance D and the relative speed ΔV as an index indicating a collision risk.

More specifically, the vehicle control apparatus 11 acquires a first collision risk, which is information regarding the risk of the collision with the obstacle, based on the relative distance D and the relative speed ΔV between the obstacle ahead of the vehicle 1 acquired by the first external world perception apparatus 10A, and the vehicle 1 in step S103.

In the next step, step S104, the vehicle control apparatus 11 determines whether there is a possibility that the vehicle 1 collides with the obstacle by comparing the time-to-collision TTC calculated in step S103 and a first threshold value TH1.

The first threshold value TH1 is a boundary value of the time-to-collision TTC for discriminating whether the execution of the autonomous braking for avoiding the collision is required, i.e., whether the intervention of the driving aid is required.

Then, a state that the time-to-collision TTC is equal to or shorter than the first threshold value TH1 corresponds to a state that there is a possibility that the vehicle 1 collides with the obstacle, and the execution of the autonomous braking for avoiding the collision is required.

On the other hand, a state that the time-to-collision TTC is longer than the first threshold value TH1 corresponds to a state not so emergent that the execution of the autonomous braking for avoiding the collision is required.

If the time-to-collision TTC is equal to or shorter than the first threshold value TH1 and the execution of the collision avoidance control is required, the vehicle control apparatus 11 proceeds to step S105 and steps subsequent thereto, and conducts the autonomous braking for avoiding the collision. The autonomous brake control for avoiding the collision will be referred to as an emergent autonomous braking mode herein.

On the other hand, if the time-to-collision TTC is longer than the first threshold value TH1 and the execution of the autonomous braking for avoiding the collision is unnecessary, the vehicle control apparatus 11 ends the present routine without conducting the autonomous braking, i.e., the emergent autonomous braking mode.

In step S105, the vehicle control apparatus 11 executes the emergent autonomous braking mode as a first step of the collision avoidance control, and outputs a braking instruction for avoiding the collision to the wheel cylinder hydraulic pressure control apparatus 6.

In other words, the emergent autonomous braking mode corresponds to an AEB (Autonomous Emergency Braking) apparatus.

In the emergent autonomous braking mode, the vehicle control apparatus 11 sets, for example, a target deceleration for allowing the vehicle 1 to be stopped before reaching the obstacle without colliding with the obstacle, generates a braking instruction for allowing the deceleration of the vehicle 1 to match the target deceleration, and outputs the generated braking instruction to the wheel cylinder hydraulic pressure control apparatus 6.

The wheel cylinder hydraulic pressure control apparatus 6 applies the brake hydraulic pressure according to the braking instruction acquired from the vehicle control apparatus 11 to each of the wheel cylinders 4L, 4R, 5L, and 5R, thereby autonomously applying the braking force to the vehicle 1.

In this manner, the vehicle control apparatus 11 outputs a first control instruction for autonomously applying the braking force to the vehicle 1 in step S105 based on the first collision risk calculated in step S103.

After executing the emergent autonomous braking mode in step S105, in the next step, step S106, the vehicle control apparatus 11 calculates a frictional coefficient μ of the road surface on which the vehicle 1 runs based on the actual deceleration acquired when the braking instruction for allowing the deceleration of the vehicle 1 to match the target deceleration is output.

Next, in step S107, the vehicle control apparatus 11 determines a second collision risk, which is a collision risk to which the information about the frictional coefficient μ of the road surface calculated in step S106 is added.

More specifically, the vehicle control apparatus 11 acquires the second collision risk into which the first collision risk is updated by adding the information regarding the frictional coefficient μ of the road surface after the braking force is autonomously applied to the vehicle 1.

In other words, the vehicle control apparatus 11 estimates a deceleration achievable on the running road surface under the current condition based on the information regarding the frictional coefficient μ of the actual road surface calculated after the braking force is autonomously applied to the vehicle 1, and determines the collision risk based on the estimated deceleration.

If the frictional coefficient μ of the road surface is lower than a reference value, the achievable deceleration reduces compared to when the frictional coefficient μ of the road surface is equal to the reference value, and the braking distance of the vehicle 1 increases.

Therefore, if the frictional coefficient μ of the road surface is lower than the reference value, the vehicle control apparatus 11 corrects and reduces the time-to-collision TTC calculated based on the relative speed ΔV [m/s] and the relative distance D [m] so as to determine a higher collision risk than when the frictional coefficient μ of the road surface is equal to the reference value.

The vehicle control apparatus 11 can calculate a margin-to-collision MTC instead of the time-to-collision TTC as the index value of the collision risk.

The margin-to-collision MTC is an index value indicating whether the vehicle 1 collides with the obstacle even if being rapidly decelerated, and is defined to be a dimensionless quantity acquired by dividing the relative distance D by the braking distance of the vehicle 1 in a case where the obstacle is a stationary object.

Then, the margin-to-collision MTC equal to or smaller than 1 means that this vehicle highly likely collides with the obstacle even if being rapidly decelerated.

Now, the vehicle control apparatus 11 sets a deceleration serving as the basis for the braking distance of the vehicle 1 to a value based on the frictional coefficient $\mu$ of a dry road surface when determining the margin-to-collision MTC as the index value of the collision risk in step S103.

On other hand, the vehicle control apparatus 11 sets the deceleration serving as the basis for the braking distance of the vehicle 1 to a value based on the frictional coefficient $\mu$ of the actual road surface calculated in step S106 when determining the margin-to-collision MTC by adding the information regarding the frictional coefficient $\mu$ of the actual road surface in step S107.

Next, the vehicle control apparatus 11 proceeds to step S108, and determines whether the vehicle 1 can avoid the collision with the obstacle by being braked hard based on the emergent autonomous braking mode.

At this time, the vehicle control apparatus 11 determines that the collision of the vehicle 1 with the obstacle cannot be avoided only by the hard braking based on the emergent autonomous braking mode when the time-to-collision TTC acquired by adding the information regarding the frictional coefficient $\mu$ of the road surface in step S107 is equal to or shorter than a second threshold value TH2 and the absolute value of the target deceleration for allowing the vehicle 1 to be stopped before reaching the obstacle is higher than a threshold value.

In the case where the margin-to-collision MTC is calculated as the index value of the collision risk, the vehicle control apparatus 11 can determine that the collision of the vehicle 1 with the obstacle cannot be avoided only by the hard braking based on the emergent autonomous braking mode when the margin-to-collision MTC acquired by adding the information regarding the frictional coefficient $\mu$ of the actual road surface in step S107 is equal to or smaller than 1.

If determining that the collision of the vehicle 1 with the obstacle cannot be avoided only by the hard braking based on the emergent autonomous braking mode in step S108, the vehicle control apparatus 11 proceeds to step S109 and steps subsequent thereto, and executes an emergent autonomous steering mode of autonomously applying a force regarding steering to the vehicle 1 as a second step of the collision avoidance control, and outputs a control instruction for avoiding the collision to the electric power steering apparatus 8.

The above-described emergent autonomous steering mode corresponds to an AES (Autonomous Emergency Steering) apparatus.

More specifically, the vehicle control apparatus 11 outputs a second control instruction for autonomously applying a force regarding steering to the vehicle 1 based on the second collision risk determined in step S107.

On the other hand, if determining that the collision of the vehicle 1 with the obstacle can be avoided by the hard braking based on the emergent autonomous braking mode, the vehicle control apparatus 11 ends the present routine immediately, thereby continuing the emergent autonomous braking mode with an attempt to avoid the collision without executing the emergent autonomous steering mode.

In step S109, the vehicle control apparatus 11 determines an avoidance route, which is a target route of the vehicle 1 necessary to avoid the collision with the obstacle, i.e., a target running trajectory for allowing the vehicle 1 to circumvent the obstacle based on the relative positional relationship between the vehicle 1 and the obstacle, the road information, and the like.

Next, in step S110, the vehicle control apparatus 11 determines whether there is an avoidance route appropriate to cause the vehicle 1 to follow.

At this time, the vehicle control apparatus 11 can, for example, determine that a route allowing the vehicle 1 to circumvent the obstacle within the same traffic lane is the avoidance route appropriate to cause the vehicle 1 to follow, or permit the avoidance route to be set on condition that another vehicle is not present around the vehicle 1.

If there is no appropriate avoidance route, the vehicle control apparatus 11 ends the present routine immediately, thereby continuing the emergent autonomous braking mode with an attempt to reduce damage from the collision without executing the emergent autonomous steering mode.

On the other hand, if there is an appropriate avoidance route, the vehicle control apparatus 11 proceeds to step S111, and determines whether the vehicle 1 can be caused to run while following the avoidance route by the steering control based on the emergent autonomous steering mode based on, for example, a lateral acceleration necessary for causing the vehicle 1 to run while following the avoidance route.

If the vehicle 1 can be caused to follow the avoidance route based on the emergent autonomous steering mode at this time, the vehicle control apparatus 11 proceeds to step S112, and causes the vehicle 1 to run along the avoidance route by the steering control based on the emergent autonomous steering mode while continuing the emergent autonomous braking mode, thereby allowing the vehicle 1 to circumvent the obstacle. Next, in step S113, the vehicle control apparatus 11 performs processing subsequent to the avoidance of the collision.

On the other hand, if the vehicle 1 cannot be caused to follow the avoidance route based on the emergent autonomous steering mode, the vehicle control apparatus 11 proceeds to step S114 and step S115, and executes the emergent autonomous steering mode and a braking moment application mode of generating a turning moment by setting a weaker braking force on a turning outer wheel than the braking force on a turning inner wheel to allow the vehicle 1 to follow the avoidance route. After that, in step S115, the vehicle control apparatus 11 performs the processing subsequent to the avoidance of the collision.

The details of the processing content in the above-described steps, steps S112 to S115 will be described below.

Figure 4:
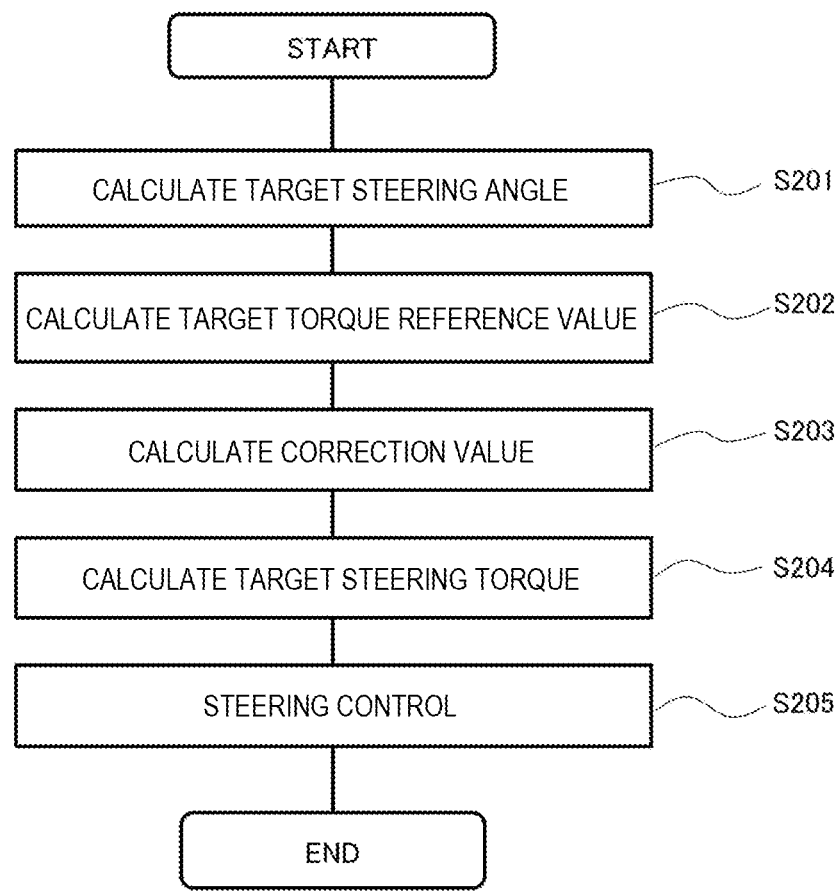
FIG. 4 is a flowchart illustrating a processing content in an emergent autonomous steering mode.

FIG. 4 is a flowchart illustrating the content of the processing in step S112 in the flowchart of FIG. 2, i.e., the content of the steering control based on the emergent autonomous steering mode when the vehicle 1 can be caused to follow the avoidance route based on the emergent autonomous steering mode.

In step S201, the vehicle control apparatus 11 calculates a target steering angle θtgt [rad] for causing the vehicle 1 to run along the avoidance route.

Next, in step S202, the vehicle control apparatus 11 calculates a steering torque necessary to allow the angle of the steering wheel 9 to reach the target steering angle θtgt as a target steering torque reference value Tref [Nm].

Now, the target steering torque reference value Tref is a target value of a torque (a steering torque) applied to the steering wheel 9 due to a self-aligning torque generated depending on the vehicle body speed V and the target steering angle θtgt.

By determining the target value of the torque applied to the steering wheel 9, the vehicle control apparatus 11 can manage both the torque generated by the motor and the steering torque derived from the operation on the steering wheel 9 performed by the driver when the instruction indicating this target torque is fed to the electric power steering apparatus 8, thereby being able to realize steering control that reduces the driver's uncomfortable feeling.

Figure 5:
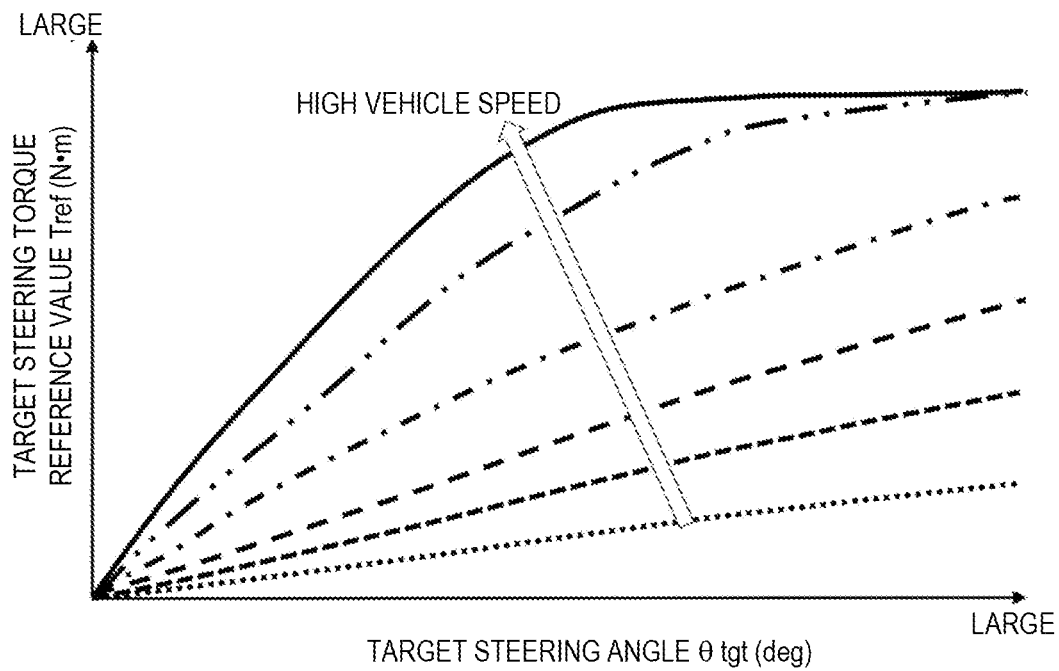
FIG. 5 is a diagram illustrating the correlation between a target steering angle and a target steering torque reference value.

FIG. 5 is a diagram illustrating one example of the characteristic of the target steering torque reference value Tref with respect to the vehicle body speed V and the target steering angle θtgt.

The vehicle control apparatus 11 sets the target steering torque reference value Tref to a larger value as the target steering torque θtgt increases, and sets the target steering torque reference value Tref to a larger value as the vehicle body speed V increases.

Next, in step S203, the vehicle control apparatus 11 calculates a correction gain Kcol (Kcol>1.0), which is a correction value used to correct the target steering torque reference value Tref, based on the time-to-collision TTC indicating the collision risk.

At this time, the vehicle control apparatus 11 increases the correction gain Kcol as the time-to-collision TTC reduces and the collision risk increases in such a manner that a final target steering torque Ttgt increases as the time-to-collision TTC reduces and the collision risk increases.

If there is a large delay in the response of the actual steering angle to the instruction indicating the target steering torque Ttgt, the vehicle 1 may become unable to avoid the collision with the obstacle.

Therefore, when the collision risk is high, i.e., the time-to-collision TTC is short, the vehicle control apparatus 11 feeds the instruction indicating the target steering torque Ttgt larger than the target steering torque reference value Tref to the electric power steering apparatus 8, thereby reducing the delay in the steering response and preventing the reduction in the collision avoidability.

Figure 6:
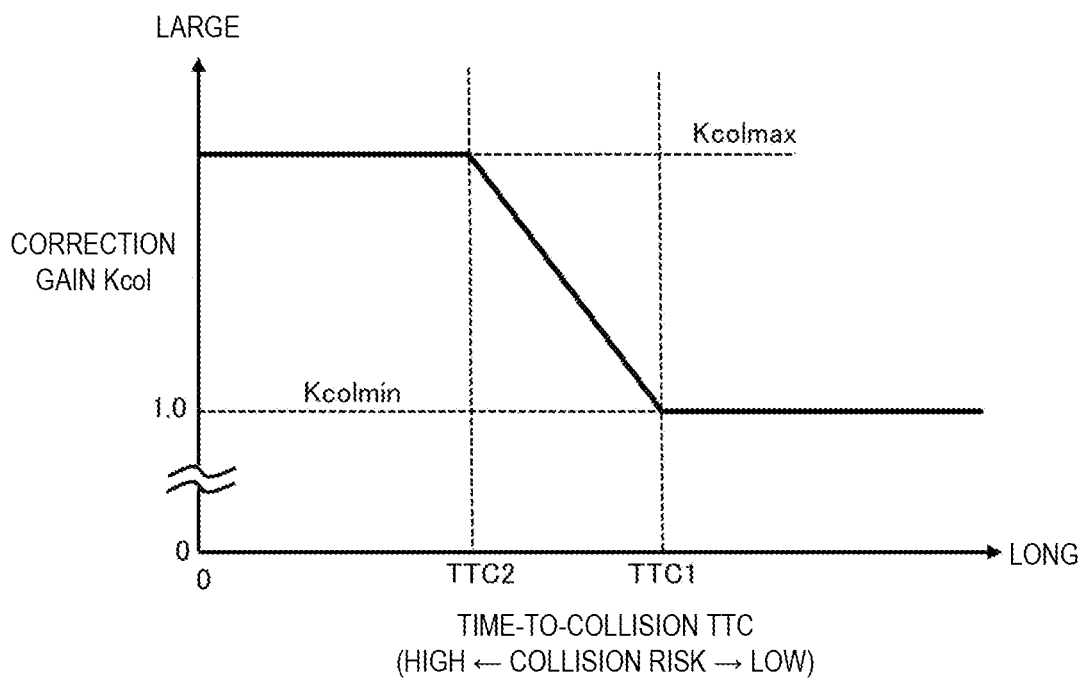
FIG. 6 is a diagram illustrating the correlation between a time-to-collision TTC and a correction gain Kcol.

FIG. 6 illustrates one example of the characteristic of the correction gain Kcol with respect to the time-to-collision TTC.

When the time-to-collision TTC is longer than a first time T1, the vehicle control apparatus 11 sets the correction gain Kcol to 1.0, which is a minimum value Kcolmin.

On the other hand, in a region where the time-to-collision TTC is equal to or shorter than the first time T1 and longer than a second time T2 (T1>T2), the vehicle control apparatus 11 proportionally increases the correction gain Kcol as the time-to-collision TTC reduces, i.e., as the collision risk increases.

Then, when the time-to-collision TTC matches or falls below the second time T2, the vehicle control apparatus 11 keeps the correction gain Kcol at a maximum value Kcolmax (Kcolmax>1.0).

After setting the correction gain Kcol in step S203, the vehicle control apparatus 11 proceeds to the next step, step S204, and calculates the final target steering torque Ttgt by multiplying the target steering torque reference value Tref by the correction gain Kcol (Ttgt=Tref×Kcol).

Then, in the next step, step S205, the vehicle control apparatus 11 outputs the instruction indicating the target steering torque Ttgt to the electric power steering apparatus 8 as the steering torque instruction.

In other words, the vehicle control apparatus 11 outputs the second control instruction for autonomously applying the force regarding steering to the vehicle 1 to the electric power steering apparatus 8 serving as the steering control apparatus based on the collision risk updated by adding the information regarding the frictional coefficient μ of the road surface.

Figure 7:
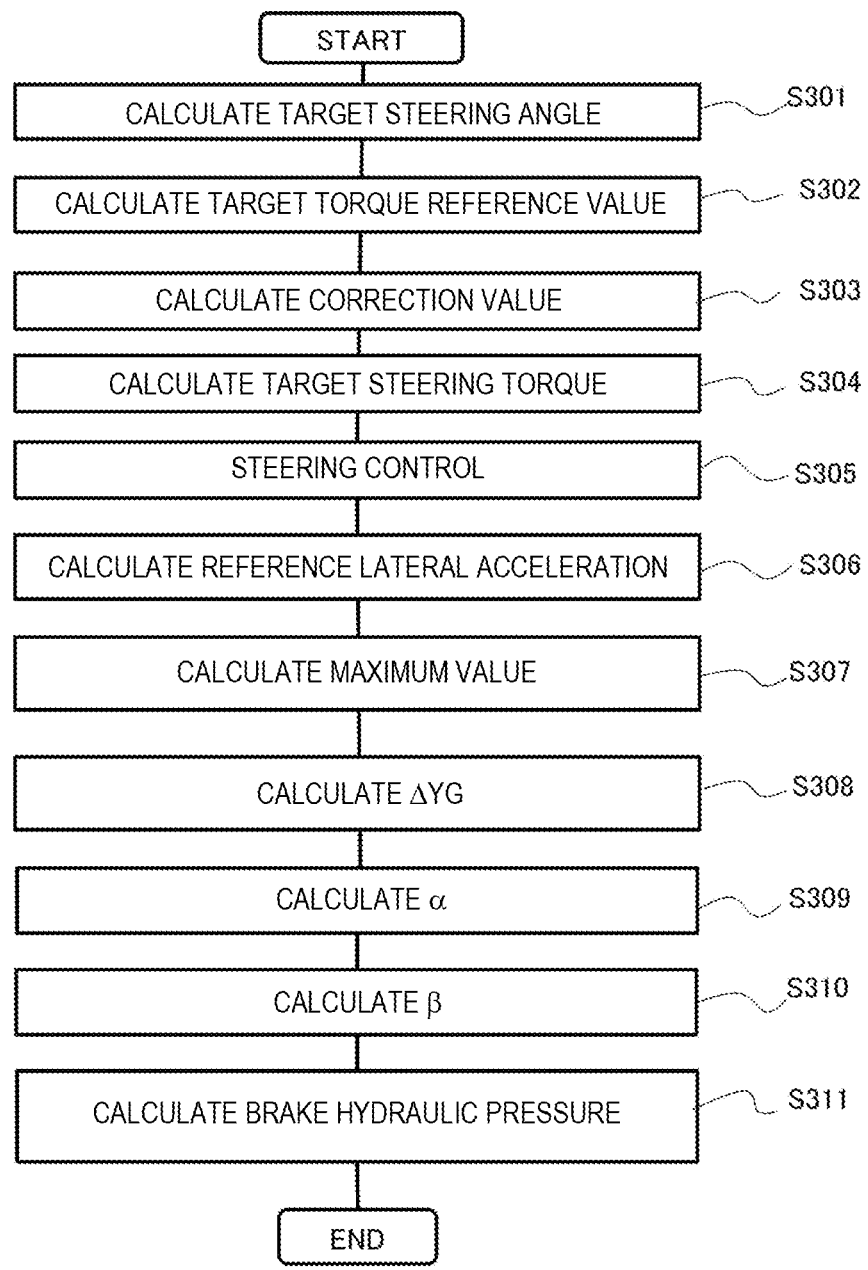
FIG. 7 is a flowchart illustrating a processing content in the emergent autonomous steering mode and a braking moment application mode.

FIG. 7 is a flowchart illustrating the content of the processing in step S114 in the flowchart of FIG. 2, i.e., the content of the steering control and the braking force control when the vehicle 1 cannot be caused to follow the avoidance route only by executing the emergent autonomous steering mode and is caused to follow the avoidance route by executing the emergent autonomous steering mode and the braking moment application mode.

In this flowchart, the content of the steering control based on the emergent autonomous steering mode from step S301 to step S305 is similar to the processing from step S201 to step S205 in FIG. 4, and therefore the detailed description thereof will be omitted here.

After performing the steering control in the emergent autonomous steering mode in steps S301 to S305, further, in step S306 and steps subsequent thereto, the vehicle control apparatus 11 executes the braking moment application mode of generating a turning moment on the vehicle 1 by setting a weaker braking force on the turning outer wheel than the braking force on the turning inner wheel.

In other words, the vehicle control apparatus 11 outputs a third control instruction for controlling the braking force to be generated on the wheel portion of the vehicle 1 based on the second collision risk after the force regarding steering is autonomously applied to the vehicle 1 according to the second control instruction. At this time, the vehicle control apparatus 11 determines the third control instruction according to the avoidance route of the vehicle 1 with respect to the obstacle.

In step S306, the vehicle control apparatus 11 calculates a lateral acceleration at each target point in the avoidance route taken when the vehicle 1 runs while following the avoidance route as a reference lateral acceleration LAref.

At this time, the vehicle control apparatus 11 determines a lateral force at each target point in the avoidance route, and calculates the reference lateral acceleration LAref at each target point based on the acquired lateral force and the vehicle mass.

Next, the vehicle control apparatus 11 proceeds to step S307, and determines the maximum value of the reference lateral acceleration LAref at each target point calculated in step S306 as a maximum reference lateral acceleration LArefmax.

Then, in the next step, step S308, the vehicle control apparatus 11 calculates a difference amount ΔYG (or a deviation amount ΔYG) between the maximum reference lateral acceleration LArefmax and an acceleration corresponding to the frictional coefficient μ of the road surface.

Next, the vehicle control apparatus 11 determines a first variable α [%] based on the difference amount ΔYG.

The above-described first variable α is a variable for setting how much the brake hydraulic pressure should be reduced on the turning outer wheel in the braking moment application mode of generating the turning moment by reducing the brake hydraulic pressure on the turning outer wheel.

The turning outer wheel refers to front and rear wheels located on the outer side of the turning when the vehicle 1 runs while turning according to the steering for avoiding the collision. Further, as will be described below, the vehicle control apparatus 11 more largely reduces the brake hydraulic pressure on the turning outer wheel as the value of the first variable a increases.

Figure 8:
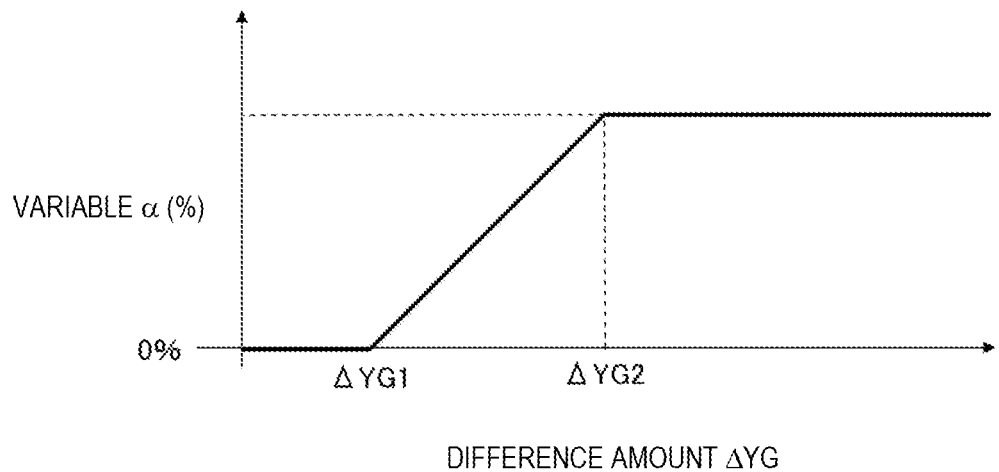
FIG. 8 is a diagram illustrating the correlation between a variable $\alpha$ and a difference amount $\Delta YG$ for determining a brake hydraulic pressure (a braking force) in the braking moment application mode.

FIG. 8 illustrates one example of the correlation between the first variable α and the difference amount ΔYG.

The vehicle control apparatus 11 sets the first variable a to zero when the difference amount ΔYG has a value between zero and a first difference amount ΔYG1 (ΔYG1>0).

On the other hand, the vehicle control apparatus 11 proportionally increases the first variable α according to an increase in the difference amount ΔYG when the difference amount ΔYG has a value between the first difference amount ΔYG1 and a second difference amount ΔYG2 (ΔYG1<ΔYG2), and keeps the first variable α at a maximum value (0%<the maximum value≤100%) when the difference amount ΔYG is equal to or greater than the second difference amount ΔYG2.

In other words, the vehicle control apparatus 11 sets the first variable a to a larger value as the difference amount ΔYG increases, i.e., the frictional coefficient μ of the road surface reduces.

Next, the vehicle control apparatus 11 proceeds to step S310, and determines a second variable β [%] for setting how much the brake hydraulic pressure should be reduced on the turning outer wheel based on the relative speed ΔVc when the vehicle 1 contacts the obstacle.

The vehicle control apparatus 11 estimates the relative speed ΔVc based on the relative distance D, the relative speed ΔV, and the deceleration at the present moment.

Further, as will be described below, the vehicle control apparatus 11 more largely reduces the brake hydraulic pressure on the turning outer wheel as the value of the second variable β increases.

Figure 9:
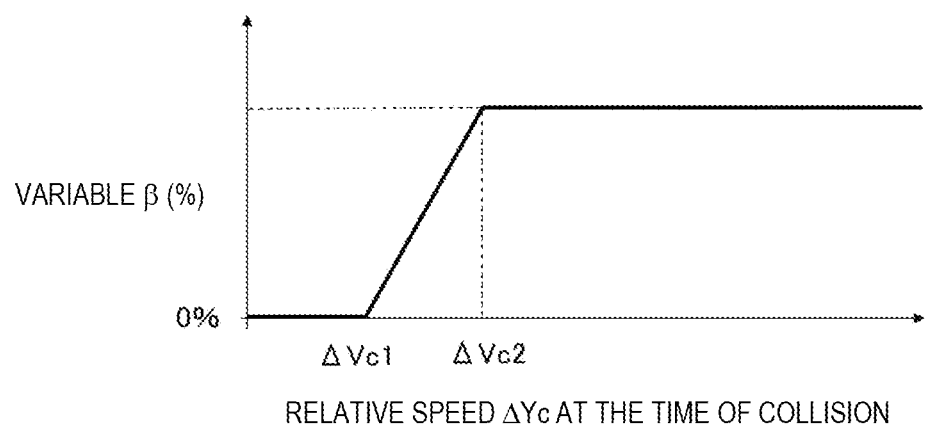
FIG. 9 is a diagram illustrating the correlation between a variable $\beta$ and a difference amount $\Delta Vc$ for determining the brake hydraulic pressure (the braking force) in the braking moment application mode.

FIG. 9 illustrates one example of the correlation between the second variable β and the relative speed ΔVc.

The vehicle control apparatus 11 sets the second variable β to zero when the relative speed ΔVc has a value between zero and a first relative speed ΔVc1 (ΔVc1>0).

On the other hand, the vehicle control apparatus 11 proportionally increases the second variable β according to an increase in the relative speed ΔVc when the relative speed ΔVc has a value between the first relative speed ΔVc1 and a second relative speed ΔVc2 (ΔVc1<ΔVc2), and keeps the second variable β at a maximum value (0%<the maximum value≤100%) when the relative speed ΔVc is equal to or higher than the second relative speed ΔVc2.

In other words, the vehicle control apparatus 11 sets the second variable β to a larger value as the relative speed ΔVc when the vehicle 1 contacts the obstacle increases.

After determining the first variable α and the second variable β, the vehicle control apparatus 11 proceeds to step S311, and configures a setting for reducing the brake hydraulic pressure on the turning outer wheel from the brake hydraulic pressure in the emergent autonomous braking mode (AEB) by an amount corresponding to a reduction correction according to the first variable a and the second variable β.

In other words, the vehicle control apparatus 11 determines the third control instruction for reducing the braking force on the turning outer wheel in the wheel portion based on the lateral acceleration generated on the vehicle 1 that is determined based on the avoidance route and the relative speed between the vehicle 1 and the obstacle.

At this time, assuming that P0 represents the brake hydraulic pressure in the emergent autonomous braking mode and P1 represents the brake hydraulic pressure on the turning outer wheel after the correction using the first variable α and the second variable β, the brake hydraulic pressure P1 on the turning outer wheel is calculated according to the following equation (1).

$$P1=P0\times(1-\alpha/100\cdot\beta/100) \quad (1)$$

This means that the vehicle control apparatus 11 more reduces the brake hydraulic pressure P1 on the turning outer wheel as the frictional coefficient μ of the road surface reduces and the difference amount ΔYG increases with respect to the maximum reference lateral acceleration LArefmax, and more reduces the brake hydraulic pressure P1 on the turning outer wheel as the relative speed ΔVc when the vehicle 1 contacts the obstacle increases.

In the braking moment application mode, the vehicle control apparatus 11 reduces the brake hydraulic pressure on the turning outer wheel from the brake hydraulic pressure P0 in the emergent autonomous braking mode according to the difference amount ΔYG and the relative speed ΔVc as described above, and keeps the brake hydraulic pressure on the turning inner wheel at the brake hydraulic pressure P0 in the emergent autonomous braking mode.

Figure 10:
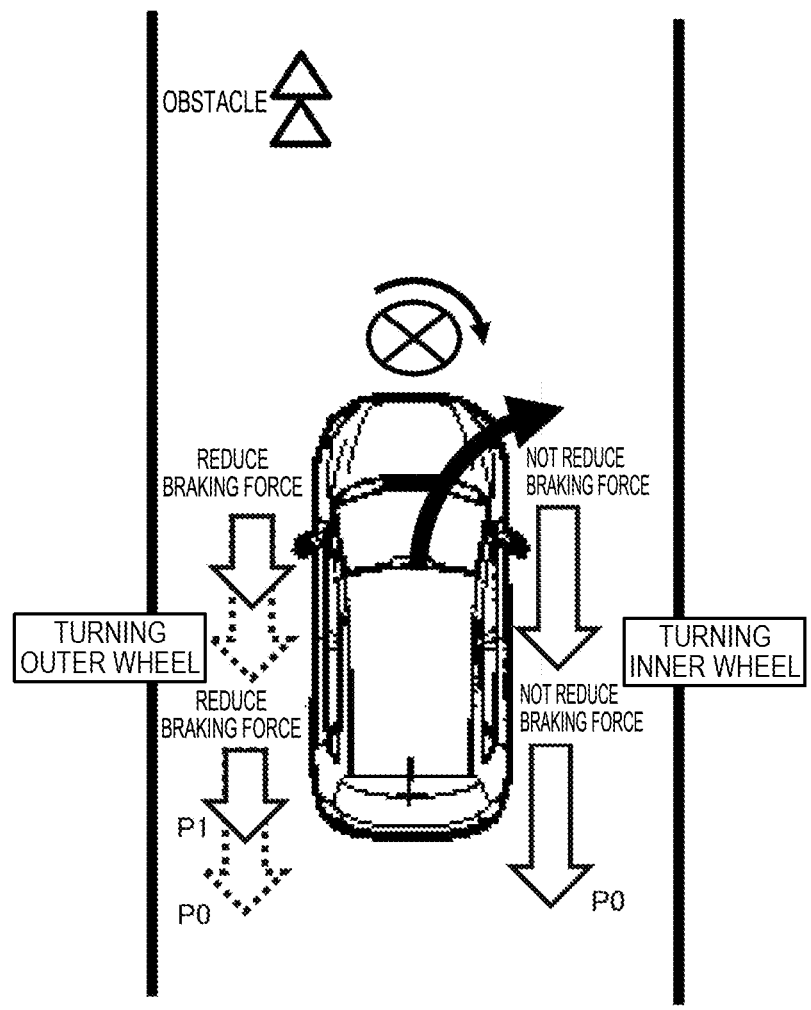
FIG. 10 illustrates how the braking force is set in the braking moment application mode.

FIG. 10 schematically illustrates how the braking force on each wheel is set in the braking moment application mode.

In the braking moment application mode, the vehicle control apparatus 11 keeps the brake hydraulic pressure on the turning inner wheel at the brake hydraulic pressure P0 in the emergent autonomous braking mode and also reduces the brake hydraulic pressure on the turning outer wheel from the brake hydraulic pressure P0 in the emergent autonomous braking mode, and therefore the brake hydraulic pressure on the turning outer wheel becomes lower than the brake hydraulic pressure on the turning inner wheel.

In other words, in the braking moment application mode, a weaker braking force is applied to the turning outer wheel than the braking force on the turning inner wheel.

A turning moment for changing the direction of the vehicle 1 toward the turning inner side is generated due to this difference between the brake hydraulic pressure on the turning outer wheel and the brake hydraulic pressure on the turning inner wheel.

Therefore, when it is difficult to cause the vehicle 1 to follow the avoidance route based on the emergent autonomous steering mode, executing the braking moment application mode can improve the followability to the avoidance route, thereby allowing the vehicle 1 to be prevented from colliding with the obstacle.

Figure 11:
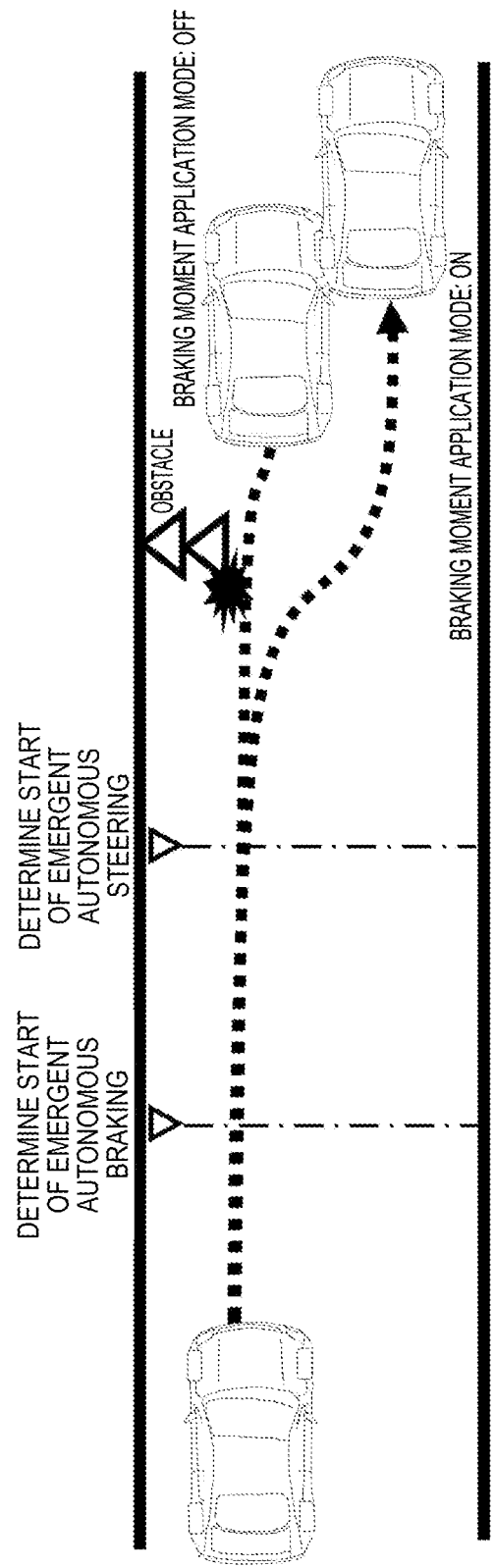
FIG. 11 illustrates a difference in a running trajectory according to whether the braking moment application mode is turned on or off.

FIG. 11 illustrates a difference in the running trajectory of the vehicle 1 when the braking moment application mode is executed and when the braking moment application mode is not executed under such a situation that it is difficult to cause the vehicle 1 to follow the avoidance route based on the emergent autonomous braking mode.

After executing the emergent autonomous braking mode based on the collision risk, the vehicle control apparatus 11 determines the frictional coefficient μ of the road surface based on the deceleration in the emergent autonomous braking mode and updates the collision risk.

Then, if estimating that the vehicle 1 cannot be stopped before reaching the obstacle by the autonomous braking based on the emergent autonomous braking mode, the vehicle control apparatus 11 executes the emergent autonomous steering mode and executes the braking moment application mode according to whether the vehicle 1 can follow the avoidance route based on the emergent autonomous steering mode after executing the emergent autonomous steering mode.

At this time, if the vehicle 1 is running on a road surface where the frictional coefficient μ is low, such as a compacted snow road, the vehicle 1 may be unable to follow the avoidance route based on the emergent autonomous steering mode and end up in contact with the obstacle.

If executing the braking moment application mode when the vehicle 1 is under such a situation, the vehicle control apparatus 11 can increase the turning controllability (the turnability) of the vehicle 1 to improve the followability to the avoidance route, thereby allowing the vehicle 1 to avoid the contact with the obstacle.

Figure 12:
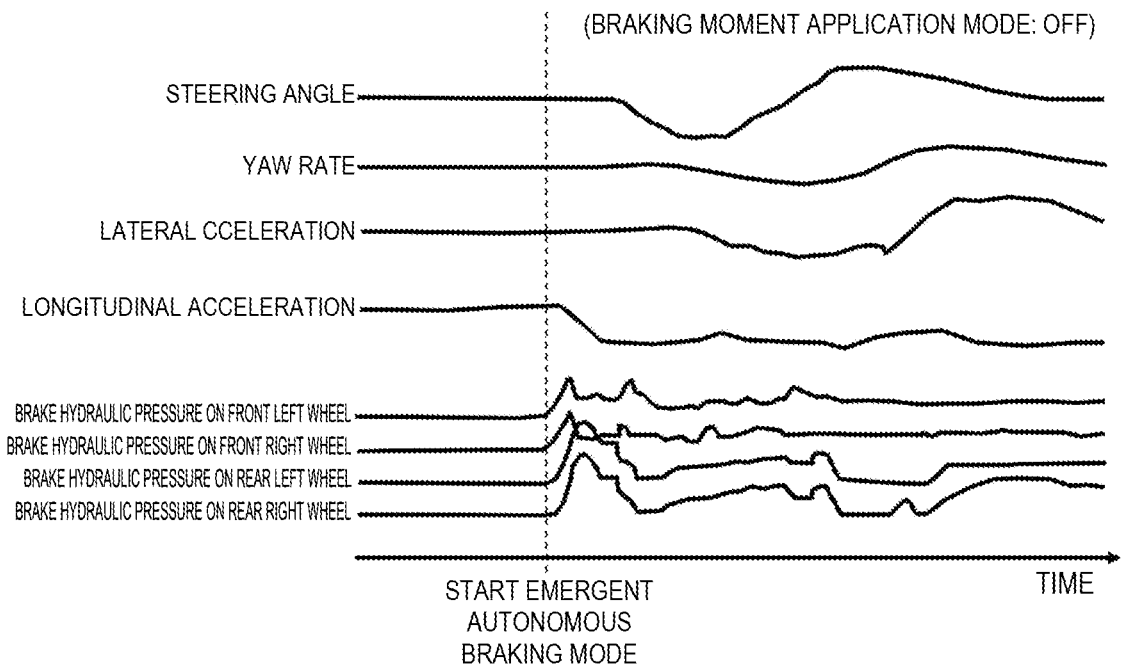
FIG. 12 is a timing chart illustrating changes in a yaw rate, a lateral acceleration, brake hydraulic pressures, and the like with the braking moment application mode turned off.
Figure 13:
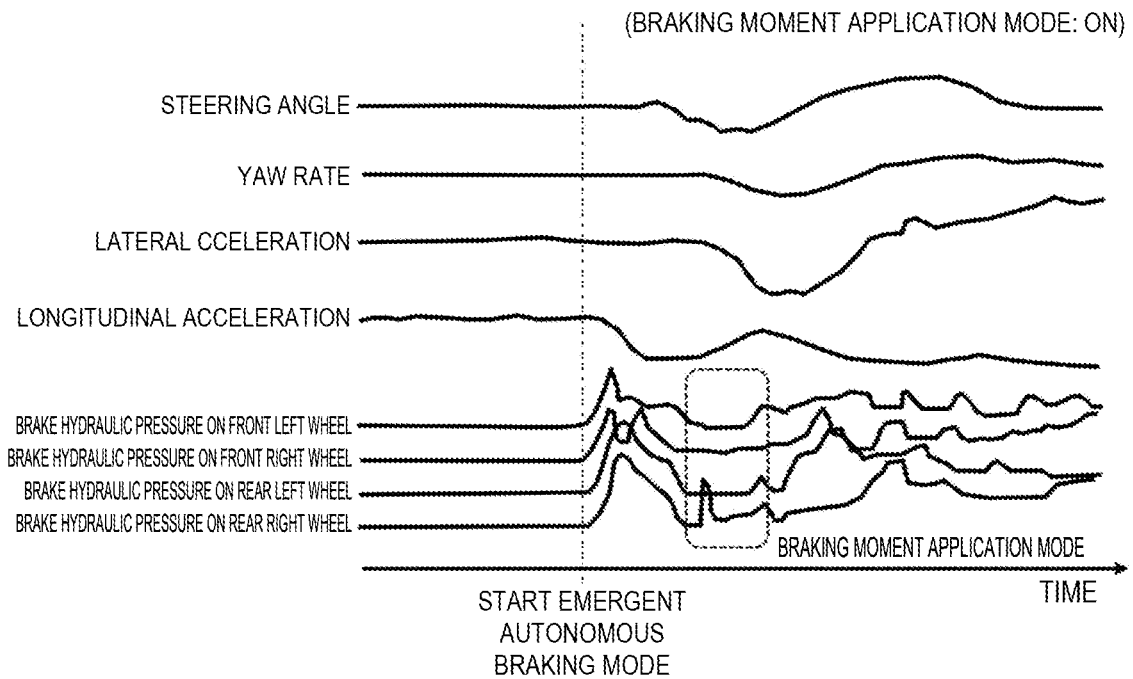

FIGS. 12 and 13 are timing charts illustrating differences in the motion state, the steering angle, and the brake hydraulic pressures of the vehicle 1 when the braking moment application mode is executed and when the braking moment application mode is not executed under such a situation that it is difficult to cause the vehicle 1 to follow the avoidance route based on the emergent autonomous braking mode.

FIG. 12 illustrates the vehicle state when the braking moment application mode is not executed, and FIG. 13 illustrates the vehicle state when the braking moment application mode is executed. Further, FIGS. 12 and 13 exemplarily illustrate an example when the vehicle 1 is caused to turn rightward to avoid the obstacle.

When the braking moment application mode is not executed as illustrated in FIG. 12, even controlling the steering angle based on the emergent autonomous steering mode fails to increase the lateral acceleration due to a slip of the turning target wheel with the yaw rate remaining in a low state, as a result of which the running trajectory of the vehicle 1 may fail to follow the avoidance route and the vehicle 1 and the obstacle may be brought into contact with each other.

The brake hydraulic pressure on each wheel is changed after the execution of the emergent autonomous braking mode is started in FIG. 12, but this is a change due to the actuation of the anti-lock brake system (ABS).

On the other hand, when the braking moment application mode is executed as illustrated in FIG. 13, the braking moment application mode sets a lower brake hydraulic pressure on the front left wheel 2L and the rear left wheel 3L, which are the turning outer wheel, than the brake hydraulic pressure on the front right wheel 2R and the rear right wheel 3R, which are the turning inner wheel, thereby generating the turning moment for turning the vehicle 1 in the turning direction along the avoidance route.

Therefore, the lateral acceleration and the yaw rate increase and the steering angle reduces compared to when the braking moment application mode is not executed, as a result of which the vehicle control apparatus 11 can allow the running trajectory of the vehicle 1 to follow the avoidance route, thereby preventing the occurrence of contact between the vehicle 1 and the obstacle.

The vehicle control apparatus 11 can output an instruction for reducing the brake hydraulic pressures for all of the four wheels as the third control instruction for controlling the braking force to be generated at the wheel portion.

In other words, the vehicle control apparatus 11 can execute a mode of reducing all the braking forces on all the wheels at the wheel portion instead of the braking moment application mode of reducing the braking force on the turning outer wheel in the wheel portion.

When reducing the braking forces on all the wheels from the brake hydraulic pressure P0 in the emergent autonomous braking mode, the vehicle control apparatus 11 can increase the lateral force generated on each wheel to improve the followability to the avoidance route, thereby allowing the vehicle 1 to avoid the obstacle.

However, the braking moment application mode leads to increases in the lateral acceleration and the yaw rate and thus a further increase in the vehicle turnability compared to the mode of reducing the braking forces on all the wheels. Further, the braking moment application mode allows the vehicle 1 to sufficiently secure the robustness against the road surface environment in the avoidance of the obstacle, thereby increasing the success rate in the avoidance of the obstacle compared to the mode of reducing the braking forces on all the wheels.

Figure 14:
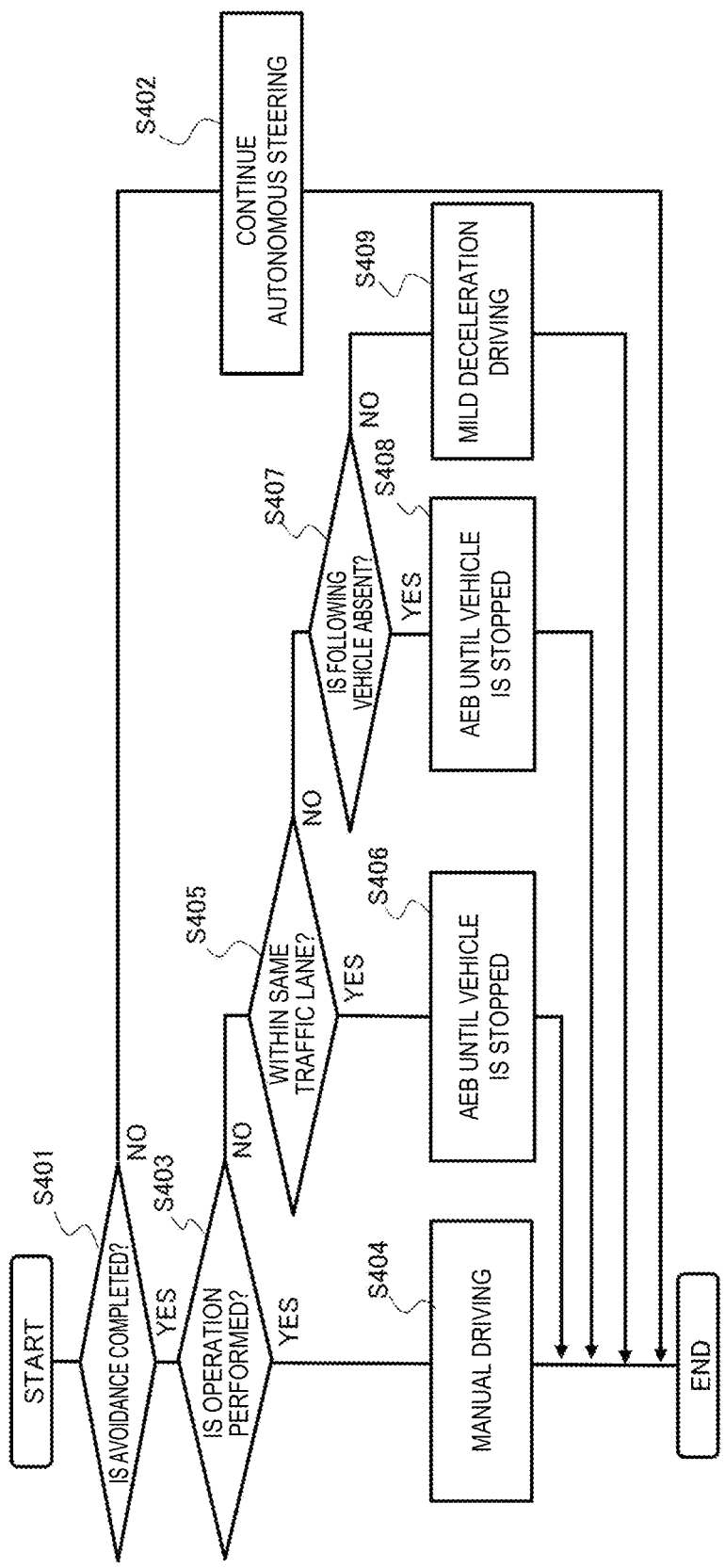
FIG. 14 is a flowchart illustrating processing after a collision is avoided based on the emergent autonomous steering mode, and processing when the vehicle includes a rear camera.

FIG. 14 is a flowchart illustrating the content of the processing in step S113 in the flowchart of FIG. 2, i.e., the processing after the avoidance of the obstacle when the vehicle 1 is caused to follow the avoidance route based on the emergent autonomous steering mode without the braking moment application mode executed.

The processing illustrated in the flowchart of FIG. 14 is processing performed by the system including the second external world perception apparatus 10B such as the rear camera used for the vehicle 1 to acquire the external world information behind the vehicle 1.

First, in step S401, the vehicle control apparatus 11 determines whether the avoidance of the obstacle is completed.

Then, if the avoidance of the obstacle is not completed, the vehicle control apparatus 11 proceeds to step S402, and causes the vehicle 1 to run along the avoidance route by continuing the emergent autonomous steering mode.

On the other hand, if the avoidance of the obstacle is completed, the vehicle control apparatus 11 proceeds to step S403, and determines whether the driver, which is a passenger of the vehicle 1, performs a driving operation on the steering wheel 9, the brake pedal, or the like.

If the driver performs a driving operation, the vehicle control apparatus 11 proceeds to step S404, and returns the vehicle 1 to the manual driving state by ending the emergent autonomous braking mode and the emergent autonomous steering mode.

Figure 15:
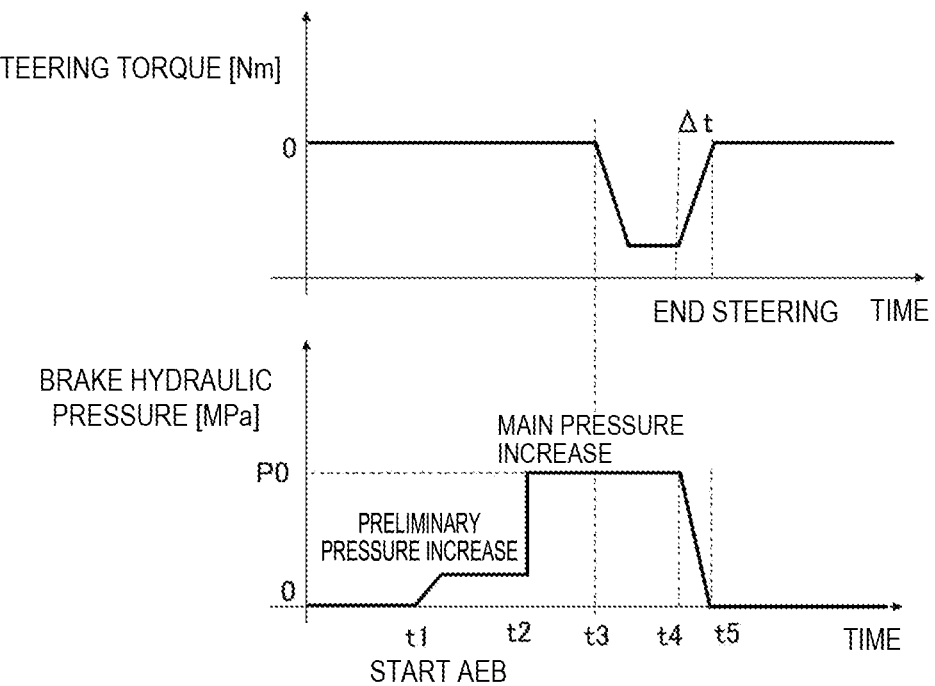
FIG. 15 is a timing chart illustrating changes in the steering torque and the brake hydraulic pressure when the vehicle is returned to manual driving in the processing after the collision is avoided based on the emergent autonomous steering mode.

FIG. 15 is a timing chart exemplarily illustrating changes in the steering torque and the brake hydraulic pressure when the vehicle control apparatus 11 executes the emergent autonomous steering mode in step S112 in FIG. 2 and returns the vehicle to the manual driving after the avoidance is completed in the next step, step S113.

After starting the emergent autonomous braking mode at time t1, first, the vehicle control apparatus 11 preliminarily increases the brake hydraulic pressures on the four wheels. After that, at time t2, the vehicle control apparatus 11 increases the brake hydraulic pressures to the brake hydraulic pressure P0 prepared for an emergent stop.

At time t3 with the brake hydraulic pressures set to the brake hydraulic pressure P0 based on the emergent autonomous braking mode, the vehicle control apparatus 11 starts the emergent autonomous steering mode based on the collision risk, thereby providing the steering torque for causing the vehicle 1 to follow the avoidance route.

Then, after the vehicle 1 avoids the obstacle at time t4 due to the execution of the emergent autonomous braking mode and the emergent autonomous steering mode, the vehicle control apparatus 11 returns the brake hydraulic pressures on the four wheels from the brake hydraulic pressure P0 based on the emergent autonomous braking mode to zero in a period from time t4 to time t5.

Further, the vehicle control apparatus 11 returns the steering torque generated by the steering motor in the emergent autonomous steering mode to zero during the time from time t4 to time t5, thereby ending the emergent autonomous braking mode and the emergent autonomous steering mode and returning the vehicle 1 to the manual driving state.

If determining that the driver performs no driving operation in step S403 in the flowchart of FIG. 14, the vehicle control apparatus 11 proceeds to step S405 and determines whether the vehicle 1 has avoided the obstacle within the same traffic lane.

If the vehicle 1 has avoided the obstacle within the same traffic lane, the vehicle control apparatus 11 proceeds to step S406, and continues the braking control based on the emergent autonomous braking mode until the vehicle 1 is stopped while ending the steering control based on the emergent autonomous steering mode.

If the driver performs no driving operation, the driver may be caught in such a situation that the driver cannot perform a driving operation, and the vehicle 1 has succeeded in avoiding the obstacle within the same traffic lane, so that it is appropriate to stop the vehicle 1 immediately.

Therefore, the vehicle control apparatus 11 ends the steering control based on the emergent autonomous steering mode when the avoidance of the obstacle is completed but continues the emergent autonomous braking mode even after the avoidance of the obstacle is completed, thereby stopping the vehicle 1.

Figure 16:
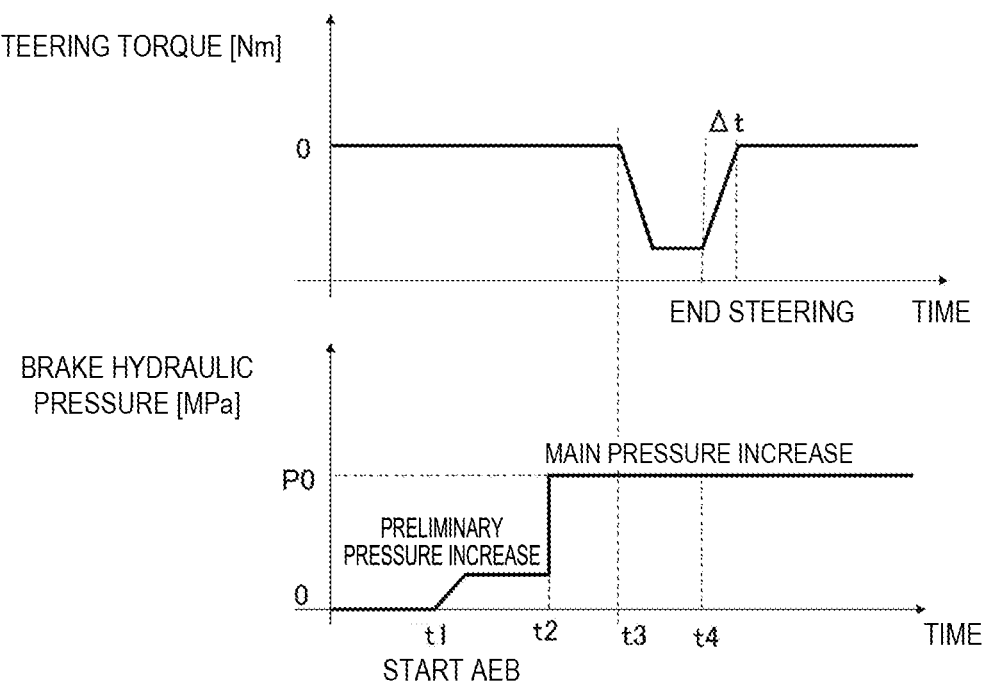
FIG. 16 is a timing chart illustrating changes in the steering torque and the brake hydraulic pressure when the emergent autonomous braking mode is continued until the vehicle is stopped in the processing after the collision is avoided based on the emergent autonomous steering mode.

FIG. 16 is a timing chart exemplarily illustrating changes in the steering torque and the brake hydraulic pressure when the vehicle control apparatus 11 executes the emergent autonomous steering mode in step S112 in FIG. 2 and continues the emergent autonomous braking mode until the vehicle 1 is stopped in the next step, step S113.

After the avoidance of the obstacle is completed at time t4, the vehicle control apparatus 11 returns the steering torque generated by the steering motor in the emergent autonomous steering mode to zero, but keeps the brake hydraulic pressures on the four wheels at the brake hydraulic pressure P0 in the emergent autonomous braking mode without changing them, thereby rapidly decelerating the vehicle 1 to stop it.

On the other hand, if determining that the vehicle has failed to avoid the obstacle within the same traffic lane and has avoided the obstacle by moving to an adjacent traffic lane in step S405, the vehicle control apparatus 11 proceeds to step S407.

More specifically, if the traffic lane has been changed so as to cause the vehicle 1 to move to the adjacent traffic lane to circumvent the obstacle by the steering control based on the emergent autonomous steering mode when the vehicle 1 is running on a road including two traffic lanes or more each way, i.e., if the avoidance route extends across a lane marking (a white line) separating traffic lanes, the vehicle control apparatus 11 proceeds to step S407.

In step S407, the vehicle control apparatus 11 determines whether there is a following vehicle behind the vehicle 1 in the traffic lane to which the vehicle has moved to avoid the collision based on the external world information behind the vehicle acquired by the second external world perception apparatus 10B.

Then, if there is no following vehicle, the vehicle control apparatus 11 proceeds to step S408, and continues the autonomous braking based on the emergent autonomous braking mode until the vehicle 1 is stopped while ending the steering control based on the emergent autonomous steering mode similarly to step S406 (refer to FIG. 16).

Even when the traffic lane has been changed to avoid the obstacle, the vehicle 1 does not become an obstacle for another vehicle even if being rapidly stopped as long as there is no following vehicle in the changed traffic lane. Therefore, the vehicle control apparatus 11 rapidly stops the vehicle 1.

On the other hand, if the traffic lane has been changed to avoid the obstacle and there is also a following vehicle in the changed traffic lane, the following vehicle may suddenly close the distance to the vehicle 1 if the vehicle 1 is rapidly stopped.

Therefore, if the traffic lane has been changed to avoid the obstacle and there is also a following vehicle in the changed traffic lane, the vehicle control apparatus 11 proceeds to step S409, and ends the steering control based on the emergent autonomous steering mode and also mildly decelerates the vehicle 1 to stop it.

In step S409, the vehicle control apparatus 11 mildly decelerates the vehicle 1 by continuing the braking while reducing the brake hydraulic pressure for each wheel from the brake hydraulic pressure P0 in the emergent autonomous braking mode of avoiding the obstacle.

In this case, the vehicle 1 is stopped by being mildly decelerated after the traffic lane has been changed, and therefore the following vehicle can take time to be decelerated.

Figure 17:
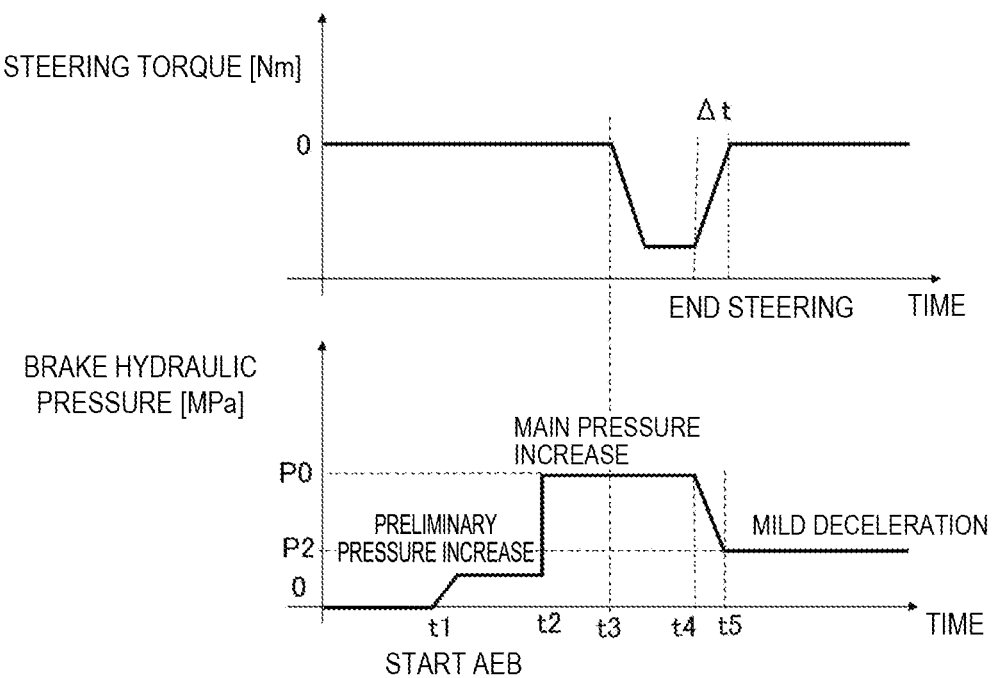
FIG. 17 is a timing chart illustrating changes in the steering torque and the brake hydraulic pressure when the vehicle is mildly decelerated in the processing after the collision is avoided based on the emergent autonomous steering mode.

FIG. 17 is a timing chart exemplarily illustrating changes in the steering torque and the brake hydraulic pressure when the vehicle control apparatus 11 executes the emergent autonomous steering mode in step S112 in FIG. 2 and mildly decelerates the vehicle 1 in the next step, step S113.

After the avoidance of the obstacle is completed at time t4, the vehicle control apparatus 11 returns the steering torque generated by the steering motor in the emergent autonomous steering mode to zero. Further, at time t4, the vehicle control apparatus 11 mildly decelerates the vehicle 1 by continuing the autonomous braking while reducing the brake hydraulic pressures on the four wheels from the brake hydraulic pressure P0 in the emergent autonomous braking mode to a predetermined pressure P2 for mildly decelerating the vehicle 1 (P0>P2>0).

Figure 18:
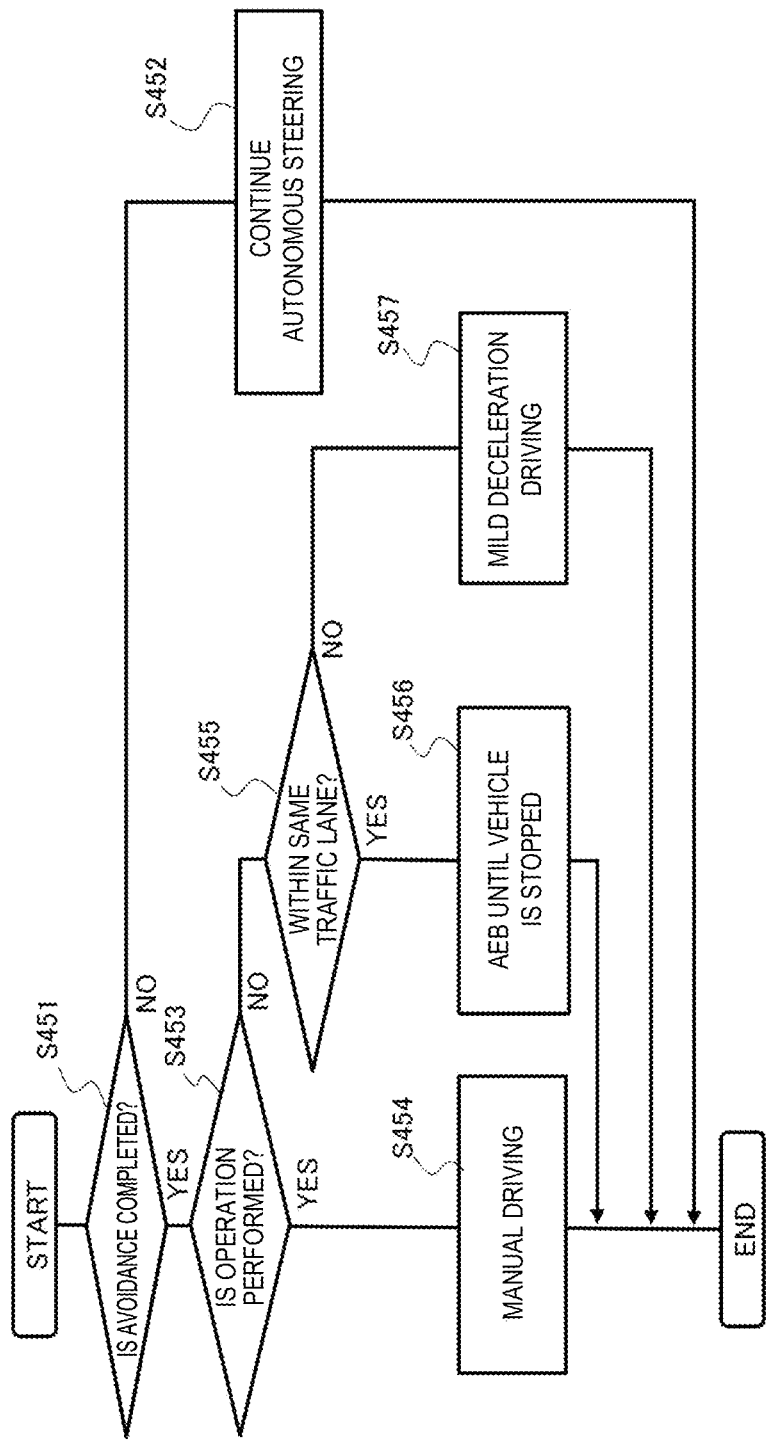
FIG. 18 is a flowchart illustrating processing after the collision is avoided based on the emergent autonomous steering mode, and processing when the vehicle includes no rear camera.

FIG. 18 is a flowchart illustrating the content of the processing in step S113 in the flowchart of FIG. 2 in a case where the vehicle 1 does not include the second external world perception apparatus 10B such as the rear camera, i.e., in such a system that the vehicle control apparatus 11 cannot determine whether there is a following vehicle.

The content of the processing in steps S451 to S456 in the flowchart of FIG. 18 is similar to steps S401 to S406 in the flowchart of FIG. 14, and therefore the detailed description thereof will be omitted here.

If determining that the vehicle 1 has failed to avoid the obstacle within the same traffic lane and has avoided the obstacle by moving to the adjacent traffic lane in step S455, the vehicle control apparatus 11 proceeds to step S457.

In step S457, the vehicle control apparatus 11 ends the steering control based on the emergent autonomous steering mode similarly to step S409 in the flowchart of FIG. 14. Further, in step S457, the vehicle control apparatus 11 mildly decelerates the vehicle 1 by continuing the autonomous braking while reducing the brake hydraulic pressures on the four wheels from the brake hydraulic pressure P0 in the emergent autonomous braking mode to the predetermined pressure P2 (P0>P2>0) (refer to FIG. 17).

In other words, the vehicle control apparatus 11 cannot determine whether there is a following vehicle when the vehicle 1 has avoided the obstacle by moving to the adjacent traffic lane in the case where the vehicle 1 does not include the second external world perception apparatus 10B.

Therefore, when the traffic lane has been changed to avoid the obstacle, the vehicle control apparatus 11 mildly decelerates the vehicle 1 in case that there is a following vehicle, thereby allowing the following vehicle to take time to be decelerated.

Figure 19:
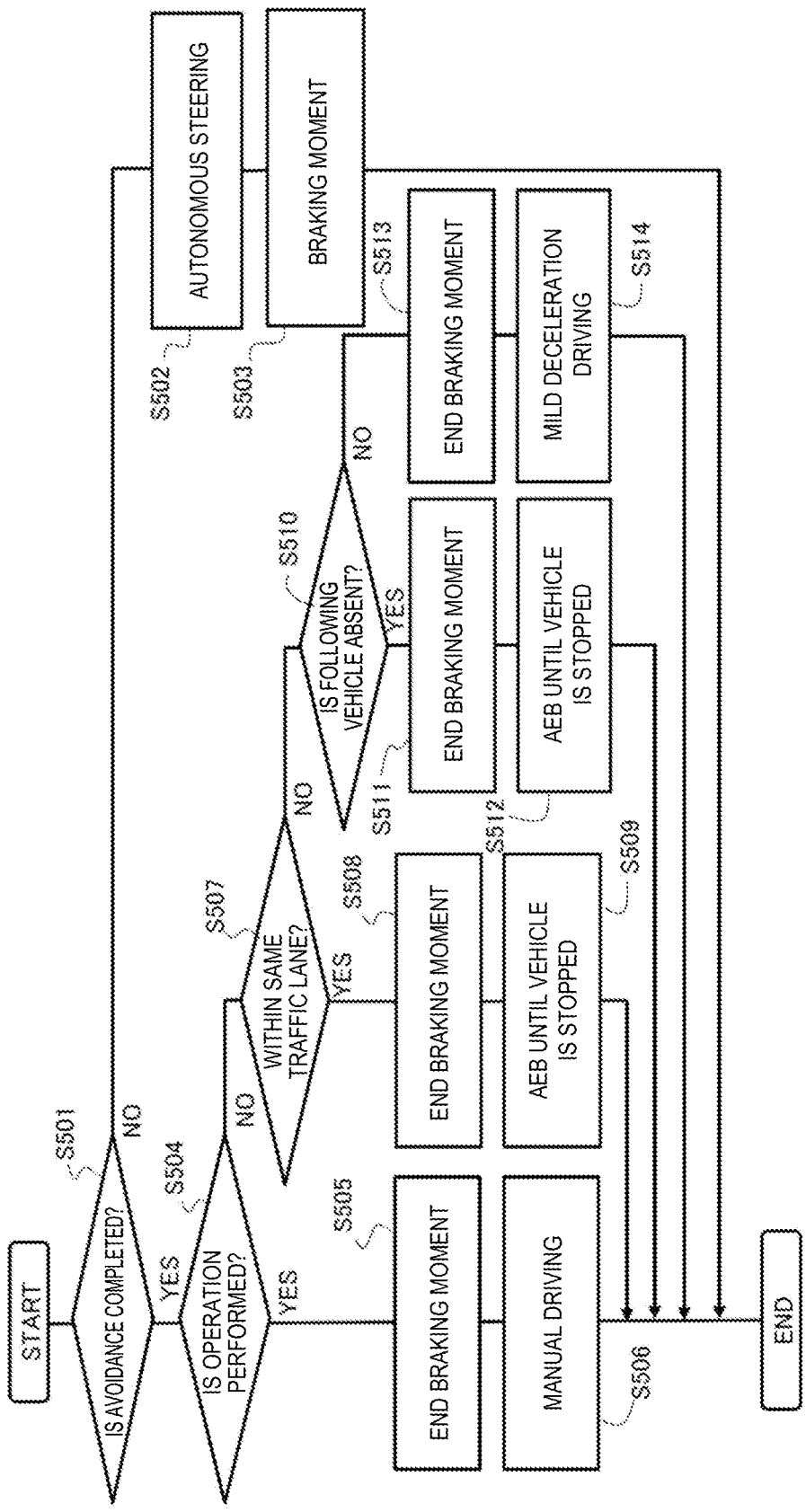
FIG. 19 is a flowchart illustrating processing after the collision is avoided based on the emergent autonomous steering mode and the braking moment application mode, and processing when the vehicle includes the rear camera.

FIG. 19 is a flowchart illustrating the content of the processing in step S115 in the flowchart of FIG. 2, i.e., the content of the processing after the avoidance of the obstacle due to the execution of the braking moment application mode.

First, in step S501, the vehicle control apparatus 11 determines whether the avoidance of the obstacle is completed.

Then, if the avoidance of the obstacle is not completed, the vehicle control apparatus 11 proceeds to steps S502 and S503, and causes the vehicle 1 to run along the avoidance route by continuing the emergent autonomous steering mode and the braking moment application mode.

On the other hand, if the avoidance of the obstacle is completed, the vehicle control apparatus 11 proceeds to step S504, and determines whether the driver of the vehicle 1 performs a driving operation on the steering wheel 9, the brake pedal, or the like.

If the driver performs a driving operation, the vehicle control apparatus 11 proceeds to step S505, and ends the braking moment application mode and cancels the processing for setting a weaker braking force on the turning outer wheel than the braking force on the turning inner wheel.

Next, the vehicle control apparatus 11 proceeds to step S506, and returns the vehicle 1 to the manual driving by ending the emergent autonomous braking mode and the emergent autonomous steering mode.

In other words, if the vehicle 1 has avoided the obstacle due to the execution of the braking moment application mode and the driver performs a driving operation, the vehicle control apparatus 11 outputs a control instruction for returning both the brake hydraulic pressures on the turning outer wheel and the turning inner wheel to zero (a fourth control instruction).

Figure 20:
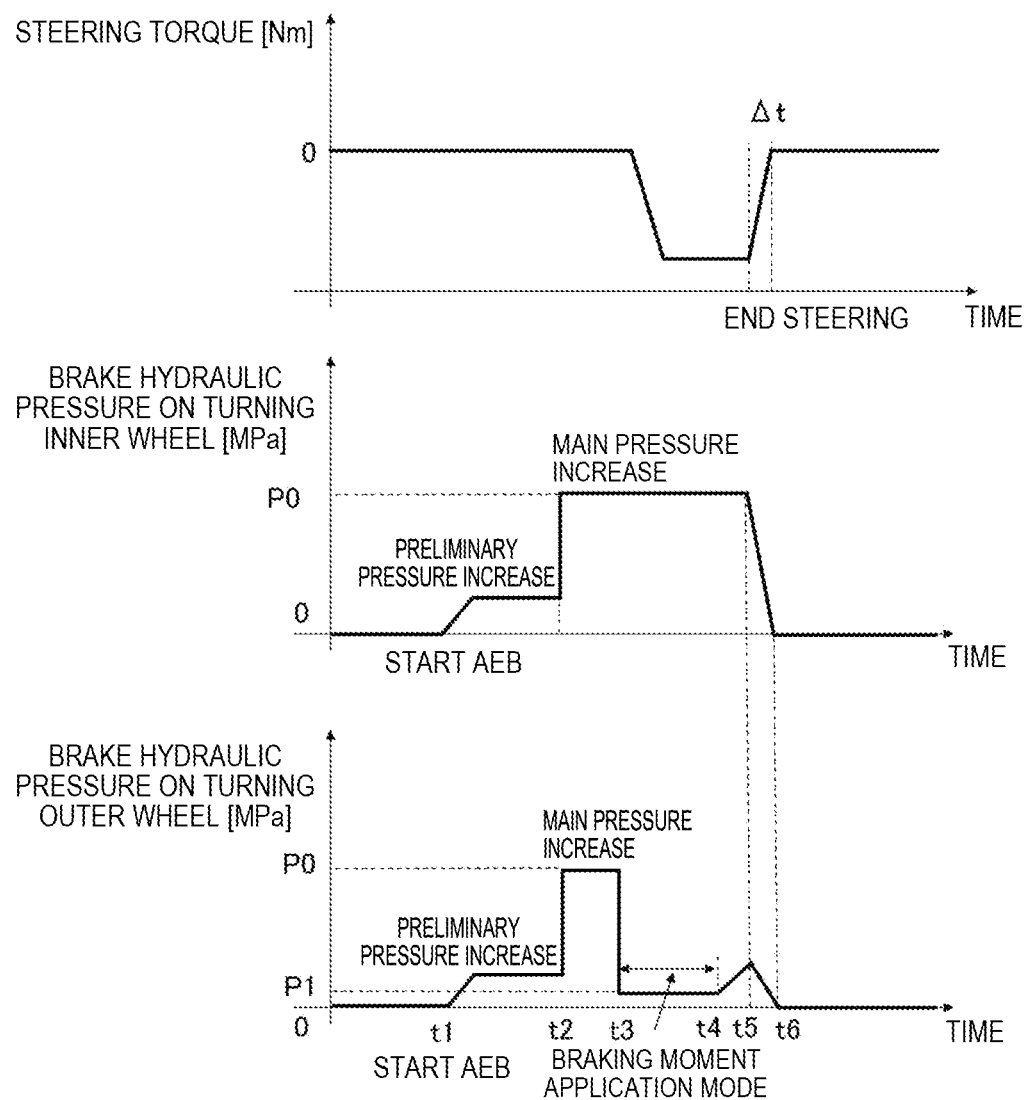
FIG. 20 is a timing chart illustrating changes in the steering torque and the brake hydraulic pressure when the vehicle is returned to the manual driving in the processing after the collision is avoided based on the emergent autonomous steering mode and the braking moment application mode.

FIG. 20 is a timing chart exemplarily illustrating changes in the steering torque and the brake hydraulic pressure when the vehicle control apparatus 11 executes the emergent autonomous steering mode and the braking moment application mode in step S114 in FIG. 2 and returns the vehicle 1 to the manual driving after the avoidance is completed in the next step, step S115.

After starting the emergent autonomous braking mode at time t1, first, the vehicle control apparatus 11 preliminarily increases the brake hydraulic pressures on the four wheels. After that, at time t2, the vehicle control apparatus 11 increases the brake hydraulic pressures to the brake hydraulic pressure P0 prepared for an emergent stop.

At time t3 after the emergent autonomous braking mode is started, the vehicle control apparatus 11 starts the emergent autonomous steering mode based on the collision risk, thereby providing the steering torque for causing the vehicle 1 to follow the avoidance route.

Further, at time t3, the vehicle control apparatus 11 starts the braking moment application mode based on the determination about the followability to the avoidance route, and reduces the brake hydraulic pressure on the turning outer wheel from the brake hydraulic pressure P0 to the brake hydraulic pressure P1 according to the above-described first variable α and second variable β without changing the brake hydraulic pressure on the turning inner wheel from the brake hydraulic pressure P0 in the emergent autonomous steering mode.

Then, at time t4, when determining that the vehicle 1 has avoided the obstacle, the vehicle control apparatus 11 returns the brake pressure on the turning outer wheel toward the brake hydraulic pressure P0 in the emergent autonomous braking mode by ending the braking moment application mode.

Further, the vehicle control apparatus 11 ends the emergent autonomous braking mode and the emergent autonomous steering mode at time t5 and returns the brake hydraulic pressures on the four wheels in the emergent autonomous braking mode to zero during a period from time t5 to time t6. Further, the vehicle control apparatus 11 returns the steering torque generated by the steering motor in the emergent autonomous steering mode to zero during the period from time t5 to time t6, thereby returning the vehicle 1 to the manual driving state.

If determining that the driver performs no driving operation in step S504 in the flowchart of FIG. 19, the vehicle control apparatus 11 proceeds to step S507, and determines whether the vehicle 1 has avoided the obstacle within the same traffic lane.

If the vehicle 1 has avoided the obstacle within the same traffic lane, the vehicle control apparatus 11 proceeds to step S508, and ends the braking moment application mode.

Further, the vehicle control apparatus 11 proceeds to step S509, and ends the steering control based on the emergent autonomous steering mode and continues the braking control based on the emergent autonomous braking mode, i.e., the control of keeping the brake hydraulic pressures on the four wheels at the brake hydraulic pressure P0 in the emergent autonomous braking mode until the vehicle 1 is stopped.

In the braking moment application mode, the brake hydraulic pressure on the turning outer wheel is reduced from the brake hydraulic pressure P0 in the emergent autonomous braking mode to the brake hydraulic pressure P1 according to the variables α and β. Therefore, in step S509, the vehicle control apparatus 11 increases the brake hydraulic pressure on the turning outer wheel from the brake hydraulic pressure P1 in the braking moment application mode to the brake hydraulic pressure P0 in the emergent autonomous braking mode.

In other words, if the vehicle 1 is determined to have avoided the obstacle within the same traffic lane and the passenger performs no driving operation after the start of the braking moment application mode, the vehicle control apparatus 11 outputs a control instruction for increasing the brake hydraulic pressure on the turning outer wheel (a fifth control instruction).

Figure 21:
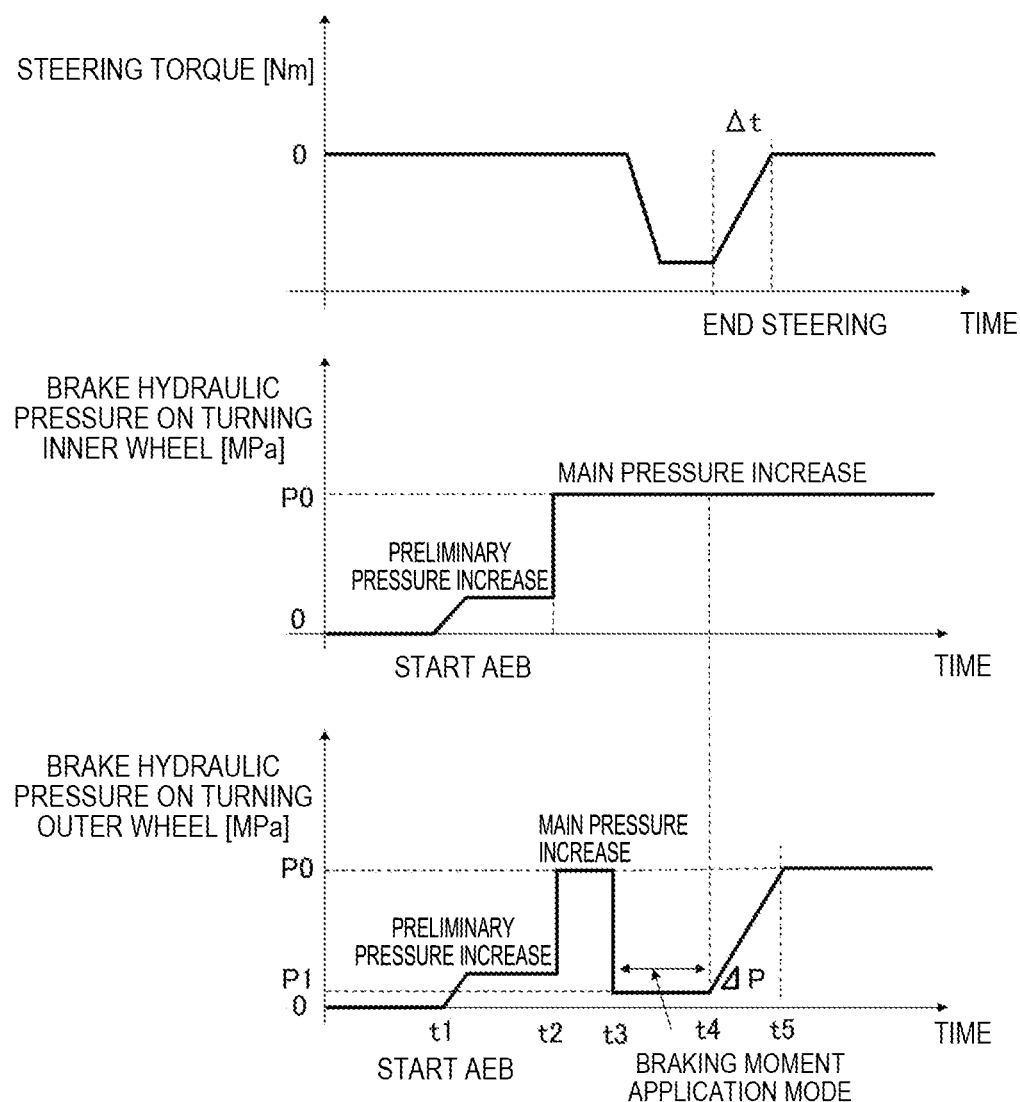
FIG. 21 is a timing chart illustrating changes in the steering torque and the brake hydraulic pressure when the emergent autonomous braking mode is continued until the vehicle is stopped in the processing after the collision is avoided based on the emergent autonomous steering mode and the braking moment application mode.

FIG. 21 is a timing chart exemplarily illustrating changes in the steering torque and the brake hydraulic pressure when the vehicle control apparatus 11 executes the emergent autonomous steering mode and the braking moment application mode in step S114 in FIG. 2 and continues the emergent autonomous braking mode until the vehicle 1 is stopped after the avoidance is completed in the next step, step S115.

After the avoidance of the obstacle is completed at time t4, the vehicle control apparatus 11 returns the steering torque generated by the steering motor in the emergent autonomous steering mode to zero during the period from time t4 to time t5.

Further, after the avoidance of the obstacle is completed at time t4, the vehicle control apparatus 11 returns the brake hydraulic pressure on the turning outer wheel from the brake hydraulic pressure P1 in the braking moment application mode to the brake hydraulic pressure P0 in the emergent autonomous braking mode at a predetermined speed ΔP, and keeps the brake hydraulic pressures on the turning outer wheel and the turning inner wheel at the brake hydraulic pressure P0 in the emergent autonomous braking mode, thereby rapidly decelerating the vehicle 1 to stop it.

If determining that the vehicle 1 has failed to avoid the obstacle within the same traffic lane and has avoided the obstacle by moving to the adjacent traffic lane in step S507, the vehicle control apparatus 11 proceeds to step S510.

In step S510, the vehicle control apparatus 11 determines whether there is a following vehicle behind the vehicle 1 in the traffic lane to which the vehicle has moved to avoid the collision based on the external world information behind the vehicle 1 acquired by the second external world perception apparatus 10B.

Then, if there is no following vehicle, the vehicle control apparatus 11 proceeds to step S511, and ends the braking moment application mode.

Further, the vehicle control apparatus 11 proceeds to step S512, and ends the steering control based on the emergent autonomous steering mode and continues the braking control based on the emergent autonomous braking mode until the vehicle 1 is stopped.

The content of the processing in steps S511 and S512 is similar to the content of the processing in steps S508 and S509, and therefore the detailed description of the content of the processing in steps S511 and S512 will be omitted below.

Further, the brake hydraulic pressure and the steering torque when the vehicle control apparatus 11 performs the processing in steps S511 and S512 change as indicated in the timing chart of FIG. 21.

On the other hand, if the traffic lane has been changed to avoid the obstacle and there is also a following vehicle in the changed traffic lane, a rapid stop of the vehicle 1 leads to requiring a rapid stop to the following vehicle.

Therefore, if the traffic lane has been changed to avoid the obstacle and there is also a following vehicle in the changed traffic lane, the vehicle control apparatus 11 proceeds to step S513.

In step S513, the vehicle control apparatus 11 ends the braking moment application mode.

Further, the vehicle control apparatus 11 proceeds to step S514, and ends the steering control based on the emergent autonomous steering mode and further mildly decelerates the vehicle 1 by shifting the brake pressures on the turning outer wheel and the turning inner wheel to the predetermined pressure P2 for mildly decelerating the vehicle 1 (P0>P2>0) and keeping them at the predetermined pressure P2.

In this case, the vehicle 1 is stopped while being mildly decelerated after the change of the traffic lane, and therefore the following vehicle can take time to be decelerated.

Figure 22:
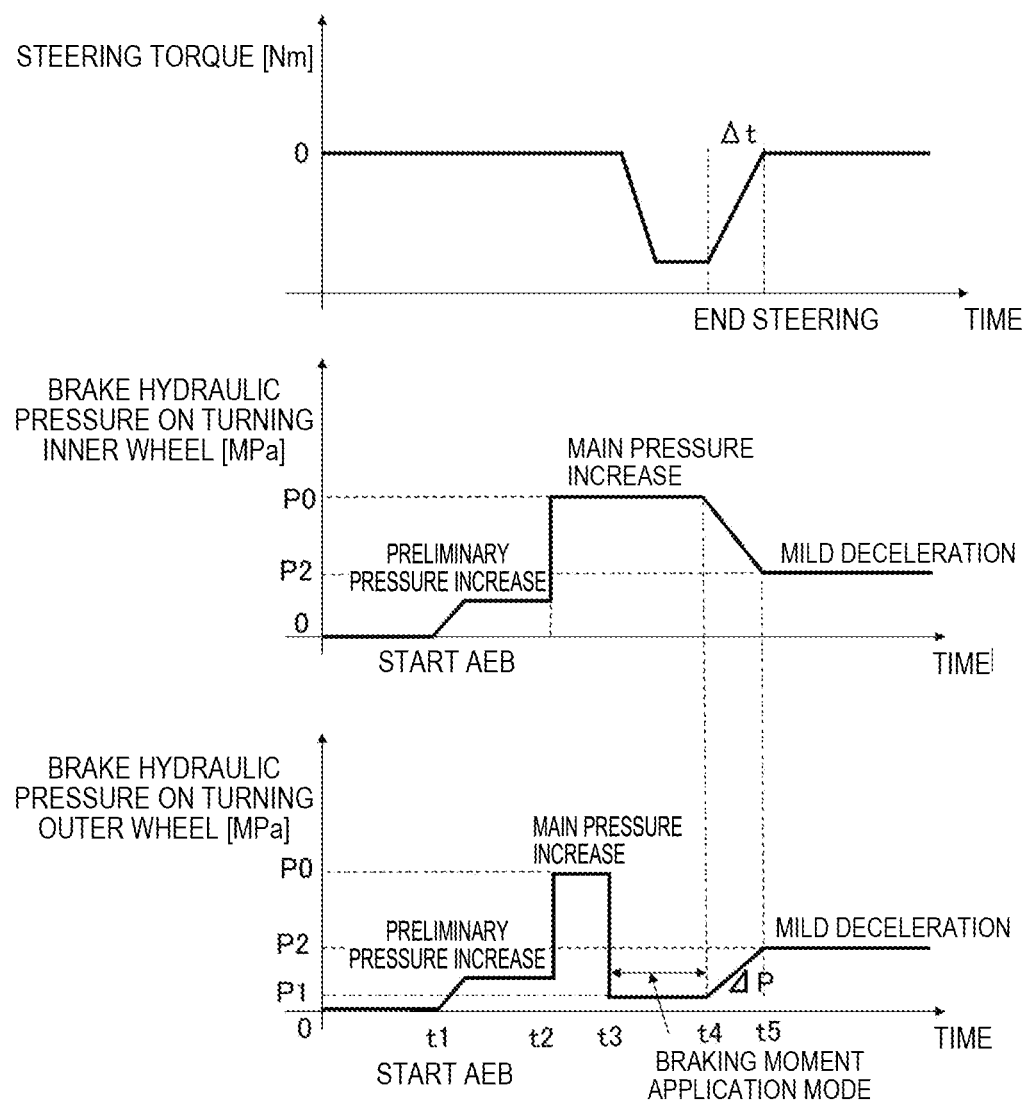
FIG. 22 is a timing chart illustrating changes in the steering torque and the brake hydraulic pressure when the vehicle is mildly decelerated in the processing after the collision is avoided based on the emergent autonomous steering mode and the braking moment application mode.

FIG. 22 is a timing chart exemplarily illustrating changes in the steering torque and the brake hydraulic pressure when the vehicle control apparatus 11 executes the emergent autonomous steering mode and the braking moment application mode in step S114 in FIG. 2 and mildly decelerates the vehicle 1 after the avoidance is completed in the next step, step S115.

After the avoidance of the obstacle is completed at time t4, the vehicle control apparatus 11 returns the steering torque generated by the steering motor in the emergent autonomous steering mode to zero.

Further, after the avoidance of the obstacle is completed at time t4, the vehicle control apparatus 11 mildly decelerates the vehicle 1 by reducing the brake hydraulic pressure on the turning inner wheel from the brake hydraulic pressure P0 in the emergent autonomous braking mode to the predetermined pressure P2 for mildly decelerating the vehicle 1 (P0>P2>0) during the period from time t4 to time t5 and further increasing the brake hydraulic pressure on the turning outer wheel from the brake hydraulic pressure P1 in the braking moment application mode to the above-described predetermined pressure P2 at the predetermined speed ΔP, and keeping the brake hydraulic pressures on the left and right wheels at the predetermined pressure P2.

According to the processing in the above-described steps S510 to S514, the vehicle control apparatus 11 outputs a control instruction for increasing the braking force on the turning outer wheel (a sixth control instruction) when the presence of another vehicle cannot be confirmed behind the vehicle 1, if the vehicle 1 is determined to have avoided the obstacle by moving to the adjacent traffic lane and no driving operation is performed by the passenger of the vehicle 1 after starting the braking moment application mode.

On the other hand, the vehicle control apparatus 11 outputs a control instruction for increasing the braking force on the turning outer wheel and reducing the braking force on the turning inner wheel (a seventh control instruction) when the presence of another vehicle can be confirmed behind the vehicle 1, if the vehicle 1 is determined to have avoided the obstacle by moving to the adjacent traffic lane and no driving operation is performed the passenger of the vehicle 1 after starting the braking moment application mode.

Figure 23:
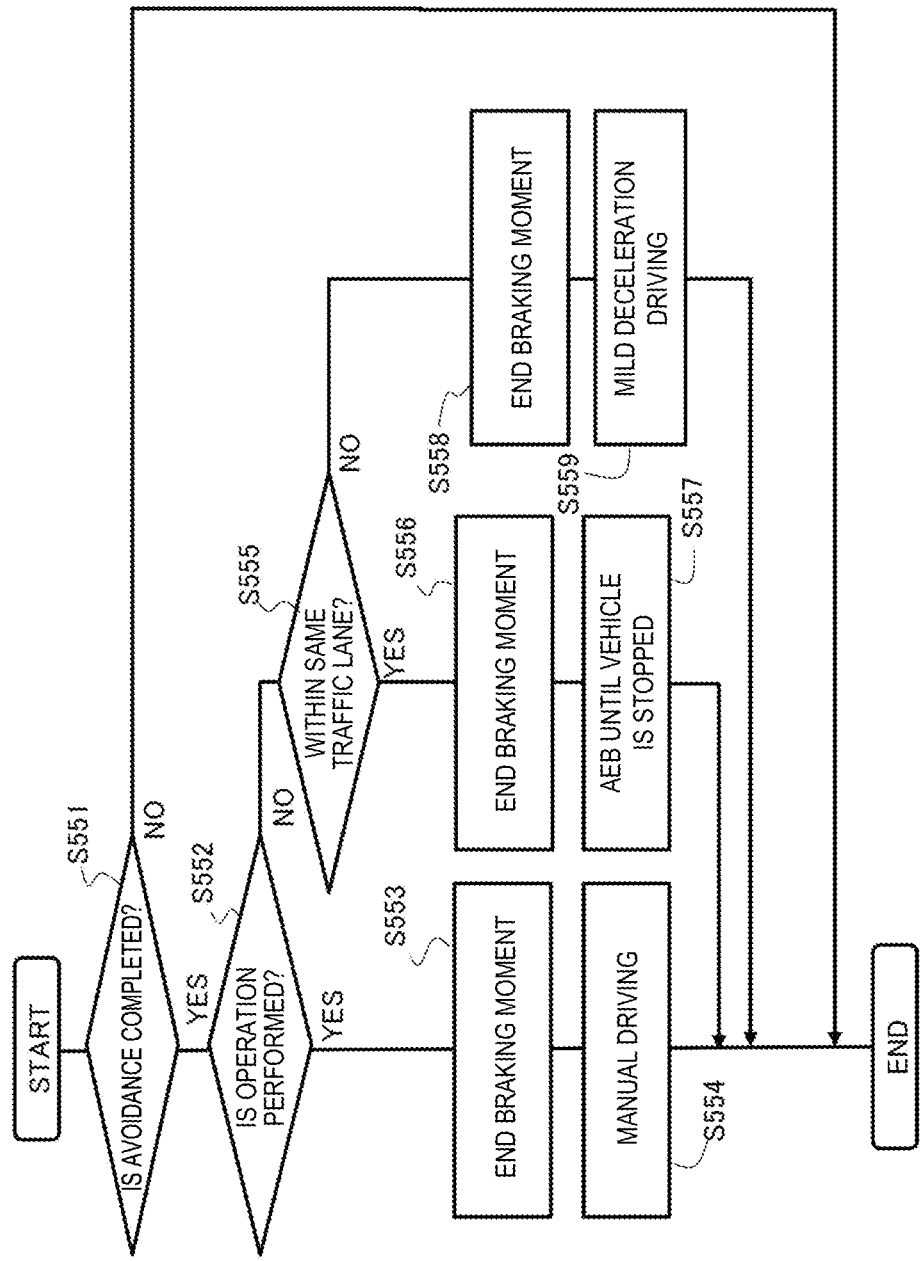
FIG. 23 is a flowchart illustrating processing after the collision is avoided based on the emergent autonomous steering mode and the braking moment application mode, and processing when the vehicle includes no rear camera.

FIG. 23 is a flowchart illustrating the content of the processing in step S115 in the flowchart of FIG. 2 in the case where the vehicle 1 does not include the second external world perception apparatus 10B such as the rear camera, i.e., in such a system that the vehicle control apparatus 11 cannot determine whether there is a following vehicle.

The content of the processing in steps S551 to S557 in the flowchart of FIG. 23 is similar to steps S501 and S504 to S509 in the flowchart of FIG. 19, and therefore the detailed description thereof will be omitted here.

Further, if determining that the avoidance of the obstacle is not completed yet in step S551, the vehicle control apparatus 11 does not perform the processing for the autonomous steering and the control moment corresponding to steps S502 and S503 in FIG. 19 because providing the lateral movement amount based on the autonomous steering or the braking moment leads to an increase in the risk of a collision from behind without the vehicle 1 including the second external world perception apparatus 10B such as the rear camera.

If determining that the vehicle 1 has failed to avoid the obstacle within the same traffic lane and has avoided the obstacle OB by moving to the adjacent traffic lane in step S555, the vehicle control apparatus 11 proceeds to step S558.

In step S558, the vehicle control apparatus 11 ends the braking moment application mode.

Subsequently, the vehicle control apparatus 11 proceeds to step S559, and ends the steering control based on the emergent autonomous steering mode and also mildly decelerates the vehicle 1 by shifting the brake pressures on the turning outer wheel and the turning inner wheel to the predetermined pressure P2 for mildly decelerating the vehicle 1 (P0>P2>0) and keeping them at the predetermined pressure P2.

In other words, the vehicle control apparatus 11 cannot determine whether there is a following vehicle in the case where the vehicle 1 does not include the second external world perception apparatus 10B.

Therefore, when the traffic lane has been changed to avoid the obstacle, the vehicle control apparatus 11 mildly decelerates the vehicle 1 in case that there is a following vehicle, thereby allowing the following vehicle to take time to be decelerated.

Each technical idea described in the above-described embodiment can be used in combination as appropriate within a range not creating a contradiction.

Having described the content of the present invention specifically with reference to the preferred embodiment thereof, it is apparent to those skilled in the art that the present invention can be embodied by various modifications based on the basic technical idea and teaching of the present invention.

For example, when detecting the obstacle ahead of the vehicle 1, the vehicle control apparatus 11 can change the timing of starting the emergent autonomous braking mode based on the information about the frictional coefficient μ of the road surface that is already acquired at this point and/or the lateral movement amount necessary to circumvent the obstacle (an overlap ratio).

At this time, the vehicle control apparatus 11 can further advance the timing of starting the emergent autonomous braking mode as the frictional coefficient μ of the road surface reduces, and further advance the timing of starting the emergent autonomous braking mode as the lateral movement amount necessary to circumvent the obstacle increases.

Further, the vehicle control apparatus 11 can adjust the brake hydraulic pressure P2 for mildly decelerating the vehicle 1 to change the deceleration of the vehicle 1 according to the relative speed and/or the distance between the vehicle 1 and the following vehicle when mildly decelerating the vehicle 1 after avoiding the obstacle.

In other words, the vehicle control apparatus 11 rapidly decelerates the vehicle 1 if the time taken for the following vehicle to become close to the vehicle 1 is long, and mildly decelerates the vehicle 1 if the time taken for the following vehicle to become close to the vehicle 1 is short.

Further, the vehicle control apparatus 11 can end the braking moment application mode and return the brake pressure on the turning outer wheel to the brake hydraulic pressure P0 in the emergent autonomous braking mode if determining that it is difficult to cause the vehicle 1 to follow the avoidance route after starting executing the braking moment application mode.

Further, the vehicle control apparatus 11 can, for example, acquire the information regarding the frictional coefficient μ of the road surface from outside via wireless communication, or can estimate the frictional coefficient μ of the road surface based on information such as a rainfall, a snowfall, a temperature, and a humidity.

Further, the vehicle control apparatus 11 can increase the brake hydraulic pressure on the turning inner wheel and also reduce the brake hydraulic pressure on the turning outer wheel in the braking moment application mode.

Further, the vehicle control apparatus 11 can control the braking forces to be applied to the rear wheels so as to lock the rear wheels to cause them to slide in the braking moment application mode.

Further, the vehicle control apparatus 11 can select whether to continue the emergent autonomous braking mode or mildly decelerate the vehicle 1 until the vehicle 1 is stopped according to whether there is a following vehicle even when the vehicle 1 has succeeded in avoiding the obstacle within the same traffic lane.

Further, the vehicle control apparatus 11 can determine whether the driver is in a state of being able to perform a normal driving operation (manual driving) based on face recognition, pupil detection, or the like, and change the processing pattern after the vehicle 1 has avoided the obstacle based on a result of this determination.

For example, the vehicle control apparatus 11 can select whether to return the vehicle 1 to the manual driving if the driver is in the state of being able to perform a normal driving operation or if the driver is in the state of being able to perform a normal driving operation and performs a driving operation actually, and continue the emergent autonomous braking mode or mildly decelerate the vehicle 1 until the vehicle 1 is stopped otherwise, based on whether the traffic lane has been changed and/or there is a following vehicle.

Further, an uncomfortable feeling evoked in the driver can be reduced by returning the brake hydraulic pressure to zero and returning the steering torque to zero at close timings when the avoidance of the obstacle is completed, the driver performs a driving operation, and the vehicle control apparatus 11 ends the emergent autonomous braking mode and the emergent autonomous steering mode (refer to FIG. 15).

However, the timing of returning the brake hydraulic pressure to zero and the timing of returning the steering torque to zero do not have to match each other.

Further, the vehicle control apparatus 11 can determine whether to execute the braking moment application mode based on a vehicle behavior such as a lateral acceleration actually generated during the collision avoidance operation based on the emergent autonomous braking mode and the emergent autonomous steering mode.

In other words, the vehicle control apparatus 11 can determine to execute the braking moment application mode when a lateral acceleration required to avoid the collision is not generated.

Further, the vehicle control apparatus 11 can determine whether to execute the braking moment application mode based on a difference between the avoidance route and the actual running trajectory such as a detected value of a lateral difference amount of the vehicle 1 from the avoidance route when the vehicle 1 is caused to follow the avoidance route based on the emergent autonomous braking mode and the emergent autonomous steering mode.

In other words, the vehicle control apparatus 11 can determine to execute the braking moment application mode when a difference is generated between the avoidance route and the actual running trajectory.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2019-177003 filed on Sep. 27, 2019. The entire disclosure of Japanese Patent Application No. 2019-177003 filed on Sep. 27, 2019 including the specification, the claims, the drawings, and the abstract is incorporated herein by reference in its entirety.

REFERENCE SIGNS LIST 1 vehicle
2L, 2R, 3L, 3R wheel (wheel portion)
4L, 4R, 5L, 5R wheel cylinder
6 wheel cylinder hydraulic pressure control apparatus (braking control apparatus)
7 vehicle information acquisition apparatus
8 electric power steering apparatus (steering control apparatus)
9 steering wheel
10A first external world perception apparatus (external world perception portion)
10B second external world perception apparatus (external world perception portion)
11 vehicle control apparatus
11A microcomputer (control portion)
20 vehicle control system
21 hydraulic braking apparatus

The invention claimed is:

1. A vehicle control apparatus comprising:
a control portion configured to carry out a calculation based on input information and output a result of the calculation,
wherein the control portion
acquires a first collision risk, the first collision risk being information regarding a risk of a collision with an obstacle based on a relative distance and a relative speed between the obstacle ahead of the vehicle that is acquired by an external world perception portion, and the vehicle,
outputs a first control instruction for autonomously applying a braking force to the vehicle based on the first collision risk,
acquires a second collision risk into which the first collision risk is updated after the braking force is autonomously applied to the vehicle according to the first control instruction,
outputs a second control instruction for autonomously applying a force regarding steering to the vehicle based on the second collision risk, and
outputs a third control instruction for controlling the braking force to be generated on a wheel portion of the vehicle based on the second collision risk after the force regarding the steering is autonomously applied to the vehicle according to the second control instruction, wherein
the third control instruction is a control instruction for reducing a braking force on a turning outer wheel in the wheel portion, and
if the vehicle is determined to have avoided the obstacle:
  i) and an operation is performed by a passenger of the vehicle after the third control instruction is output, the control portion outputs a fourth control instruction for reducing the braking force on the turning outer wheel and a braking force on a turning inner wheel in the wheel portion, or
  ii) within the same traffic lane and no operation is performed by a passenger of the vehicle after the third control instruction is output, the control portion outputs a fifth control instruction for increasing the braking force on the turning outer wheel, or
  iii) by moving to an adjacent traffic lane and no operation is performed by a passenger of the vehicle after the third control instruction is output, the control portion outputs a sixth control instruction for increasing the braking force on the turning outer wheel when the presence of another vehicle cannot be confirmed behind the vehicle, and if the vehicle is determined to have avoided the obstacle by moving to the adjacent traffic lane and no operation is performed by the passenger of the vehicle after the third control instruction is output, the control portion outputs a seventh control instruction for increasing the braking force on the turning outer wheel and reducing a braking force on a turning inner wheel in the wheel portion when the presence of the another vehicle can be confirmed behind the vehicle.

2. The vehicle control apparatus according to claim 1, wherein the control portion acquires the second collision risk into which the first collision risk is updated by adding information regarding a frictional coefficient of a road surface on which the vehicle runs.

3. The vehicle control apparatus according to claim 1, wherein the control portion determines the third control instruction according to an avoidance route of the vehicle for avoiding the obstacle based on the second control instruction.

4. The vehicle control apparatus according to claim 3, wherein the control portion determines the third control instruction based on a lateral acceleration to be generated on the vehicle that is determined based on the avoidance route, and the relative speed between the vehicle and the obstacle.

5. A vehicle control method comprising:
acquiring a first collision risk, the first collision risk being information regarding a risk of a collision with an obstacle based on a relative distance and a relative speed between the obstacle ahead of the vehicle that is acquired by an external world perception portion, and the vehicle;
outputting a first control instruction for autonomously applying a braking force to the vehicle based on the first collision risk;
acquiring a second collision risk into which the first collision risk is updated after the braking force is autonomously applied to the vehicle according to the first control instruction;
outputting a second control instruction for autonomously applying a force regarding steering to the vehicle based on the second collision risk; and
outputting a third control instruction for controlling the braking force to be generated on a wheel portion of the vehicle based on the second collision risk after the force regarding the steering is autonomously applied to the vehicle according to the second control instruction, wherein
the third control instruction is a control instruction for reducing a braking force on a turning outer wheel in the wheel portion, and
if the vehicle is determined to have avoided the obstacle:
  i) and an operation is performed by a passenger of the vehicle after the third control instruction is output, the control portion outputs a fourth control instruction for reducing the braking force on the turning outer wheel and a braking force on a turning inner wheel in the wheel portion, or
  ii) within the same traffic lane and no operation is performed by a passenger of the vehicle after the third control instruction is output, the control portion outputs a fifth control instruction for increasing the braking force on the turning outer wheel, or iii) by moving to an adjacent traffic lane and no operation is performed by a passenger of the vehicle after the third control instruction is output, the control portion outputs a sixth control instruction for increasing the braking force on the turning outer wheel when the presence of another vehicle cannot be confirmed behind the vehicle, and if the vehicle is determined to have avoided the obstacle by moving to the adjacent traffic lane and no operation is performed by the passenger of the vehicle after the third control instruction is output, the control portion outputs a seventh control instruction for increasing the braking force on the turning outer wheel and reducing a braking force on a turning inner wheel in the wheel portion when the presence of the another vehicle can be confirmed behind the vehicle.

* * * * *